United States Patent
Xue et al.

(10) Patent No.: US 12,267,780 B2
(45) Date of Patent: Apr. 1, 2025

(54) COMMUNICATION METHOD AND APPARATUS FOR MONITORING A WAKE-UP SIGNAL (WUS)

(71) Applicant: HUAWEI TECHNOLOGIES CO., LTD., Guangdong (CN)

(72) Inventors: Lixia Xue, Beijing (CN); Jing Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/489,396

(22) Filed: Sep. 29, 2021

(65) Prior Publication Data

US 2022/0022137 A1     Jan. 20, 2022

Related U.S. Application Data

(63) Continuation of application No. PCT/CN2020/081614, filed on Mar. 27, 2020.

(30) Foreign Application Priority Data

Mar. 29, 2019  (CN) .......................... 201910252626.4

(51) Int. Cl.
    H04W 52/02  (2009.01)
    H04W 24/08  (2009.01)
    (Continued)

(52) U.S. Cl.
    CPC ....... *H04W 52/0232* (2013.01); *H04W 24/08* (2013.01); *H04W 72/0466* (2013.01); *H04W 72/23* (2023.01); *H04W 76/28* (2018.02)

(58) Field of Classification Search
    CPC ............. H04W 52/0232; H04W 24/08; H04W 72/0466; H04W 72/23; H04W 76/28;
    (Continued)

(56) References Cited

U.S. PATENT DOCUMENTS

2016/0374022 A1   12/2016   Ang et al.
2018/0270756 A1   9/2018    Bhattad et al.
(Continued)

FOREIGN PATENT DOCUMENTS

CN     108702707 A     10/2018
CN     109309555 A     2/2019
(Continued)

OTHER PUBLICATIONS

Office Action issued in Indian Application No. 202137048387 on Mar. 23, 2022, 7 pages.
(Continued)

*Primary Examiner* — Michael Y Mapa
(74) *Attorney, Agent, or Firm* — Fish & Richardson P.C.

(57) ABSTRACT

A communication method includes receiving monitoring information, where the monitoring information comprises information of a search space set corresponding to a wake-up signal (WUS); determining at least one of a monitoring periodicity of the WUS or a monitoring occasion in the monitoring periodicity based on the information of the search space set; receiving the WUS from the network device, where the WUS comprises wake-up information of at least one terminal device; and performing PDCCH monitoring based on wake-up information of the terminal device in on duration of at least one discontinuous reception DRX cycle corresponding to the WUS, where the wake-up information of at least one terminal device comprises the wake-up information of the terminal device.

20 Claims, 19 Drawing Sheets

(51) Int. Cl.
*H04W 72/044* (2023.01)
*H04W 72/23* (2023.01)
*H04W 76/28* (2018.01)

(58) Field of Classification Search
CPC ............. H04W 48/12; H04W 52/0235; H04W 52/0216; H04W 52/0229; H04W 52/0248; H04W 72/20; H04L 5/001; H04L 5/0023; H04L 5/0053; H04L 5/0091; H04L 27/2602; H04L 5/0044; H04L 5/0048; H04L 27/261; Y02D 30/70
USPC ........... 370/311, 338; 455/426.1, 450–452.2, 455/458, 515, 574
See application file for complete search history.

(56) References Cited

U.S. PATENT DOCUMENTS

| | | | |
|---|---|---|---|
| 2018/0279274 | A1 | 9/2018 | Sun et al. |
| 2020/0229093 | A1* | 7/2020 | Ahmad ............. H04W 52/0209 |
| 2020/0314747 | A1* | 10/2020 | Zhou ..................... H04L 5/0053 |
| 2022/0078879 | A1* | 3/2022 | Nimbalker ............ H04W 76/28 |
| 2022/0124622 | A1* | 4/2022 | Islam ..................... H04L 5/0051 |

FOREIGN PATENT DOCUMENTS

| | | | |
|---|---|---|---|
| EP | 3661094 | A1 | 6/2020 |
| WO | 2018204799 | A1 | 11/2018 |

OTHER PUBLICATIONS

Extended European Search Report issued in European Application No. 20784977.9 on Apr. 4, 2022, 6 pages.
3GPP TS 38.212 V15.5.0 (Mar. 2019), "3rd Generation Partnership Project; Technical Specification Group Radio Access Network; NR; Multiplexing and channel coding(Release 15)," Mar. 2019, 101 pages.
3GPP TS 38.213 V15.5.0 (Mar. 2019), "3rd Generation Partnership Project; Technical Specification Group Radio Access Network; NR; Physical layer procedures for control(Release 15)," Mar. 2019, 104 pages.
3GPP TS 38.321 V15.4.0 (Dec. 2018), "3rd Generation Partnership Project; Technical Specification Group Radio Access Network; NR; Medium Access Control (MAC) protocol specification(Release 15)," Dec. 2018, 77 pages.
3GPP TS 38.331 V15.4.0 (Dec. 2018), "3rd Generation Partnership Project; Technical Specification Group Radio Access Network; NR; Radio Resource Control (RRC) protocol specification(Release 15)," Dec. 2018, 474 pages.
Ericsson, "Techniques for UE Power Saving," 3GPP TSG-RAN WG1 Meeting #96, R1-1902935, Athens, Greece, Feb. 25-Mar. 1, 2019, 15 pages.
Oppo, "On wake-up procedure for feNBIoT," 3GPP TSG RAN WG1 Meeting #93, R1-1806872, Busan, Korea, May 21-25, 2018, 4 pages.
PCT International Search Report and Written Opinion issued in International Application No. PCT/CN2020/081614 on Jul. 3, 2020, 20 pages (with English translation).
Qualcomm Incorporated, "Potential Techniques for UE Power Saving," 3GPP TSG-RAN WG1 #96, R1-1903016, Athens, Greece, Feb. 25-Mar. 1, 2019, 33 pages.

* cited by examiner

COMMUNICATION METHOD AND APPARATUS FOR MONITORING A WAKE-UP SIGNAL (WUS)

CROSS-REFERENCE TO RELATED APPLICATIONS

This application is a continuation of International Application No. PCT/CN2020/081614, tiled on Mar. 27, 2020, which claims priority to Chinese Patent Application No. 201910252626.4, filed on Mar. 29, 2019. The disclosures of the aforementioned applications are hereby incorporated by reference in their entireties.

TECHNICAL FIELD

This application relates to the field of communications technologies, and in particular, to a communication method and an apparatus.

BACKGROUND

A discontinuous reception (discontinuous reception, DRX for short) technology used by a terminal device reduces power consumption of the terminal device to some extent. To further reduce power consumption of the terminal device, a wake-up signal (wake-up signal, WUS for short) is introduced. Usually, a location at which a network device sends a WUS to the terminal device is before on duration (on duration) in a DRX cycle or is a start location of on duration in a DRX cycle. If the network device sends the WUS and the WUS is detected by the terminal device, the terminal device wakes up in on duration of a corresponding DRX cycle to perform physical downlink control channel (physical downlink control channel, PDCCH for short) monitoring. Otherwise, the terminal device does not wake up, continues to sleep, and skips the DRX cycle. That the terminal device wakes up in on duration of a corresponding DRX cycle means that the terminal device needs to perform PDCCH monitoring in the on duration of the corresponding DRX cycle.

In addition, impact of some data transmission parameters on energy consumption of the terminal device is inversely proportional to impact on a data transmission rate. Therefore, for such data transmission parameters, a data transmission rate requirement needs to be ensured as much as possible while the energy consumption of the terminal device is reduced. However, after the terminal device wakes up in the on duration of the corresponding DRX cycle based on the WUS, the terminal device may not immediately obtain a data transmission parameter value indicating that energy consumption of the terminal device can be reduced by a largest amount while ensuring a current data transmission rate.

SUMMARY

Embodiments of this application provide a communication method and an apparatus, to improve energy saving performance of a terminal device while ensuring a data transmission rate requirement.

A first aspect provides a communication method. The communication method includes: A terminal device receives a first-type wake-up signal WUS from a network device, where the first-type WUS includes a first slot offset and/or a second slot offset. The first slot offset is a common minimum slot offset of a physical downlink shared channel PDSCH relative to a physical downlink control channel PDCCH for scheduling the PDSCH and an aperiodic channel state information reference signal A-CSI-RS relative to a PDCCH for scheduling the A-CSI-RS; and the second slot offset is a minimum slot offset of a physical uplink shared channel PUSCH relative to a PDCCH for scheduling the PUSCH. The terminal device performs, based on the first-type WUS, PDCCH monitoring in on duration of one or more discontinuous reception DRX cycles corresponding to the first-type WUS.

The A-CSI-RS in this solution not only includes a triggered CSI-RS used for channel measurement, but also includes a triggered CSI-RS used for interference measurement. In this solution, information included in the first-type WUS may be referred to as transmission energy consumption information.

In this solution, both a value of the first slot offset and a value of the second slot offset are in direct proportion to an energy consumption reduction that the terminal can achieve and in inverse proportion to a data transmission rate. Therefore, in this solution, the first slot offset and/or the second slot offset are/is carried in the first-type WUS. In addition, the first slot offset and/or the second slot offset that are/is carried in the first-type WUS are/is slot offsets and/or a slot offset that are/is determined by the network device based on a current data transmission rate requirement and that enable/enables the terminal device to have optimal energy consumption reduction performance at a current data transmission rate. Therefore, after waking up based on the first-type WUS, the terminal device can immediately obtain a slot offset that enables, under the current data transmission rate requirement, the terminal device to have optimal energy consumption reduction performance, thereby reducing energy consumption of the terminal device.

With reference to the first aspect, in a possible implementation, the terminal device receives a second-type WUS from the network device, where the second-type WUS includes wake-up information of a terminal device in a terminal group to which the terminal device belongs; and the terminal device performs, based on wake-up information of the terminal device, PDCCH monitoring in on duration of one or more DRX cycles corresponding to the second-type WUS.

In this solution, the terminal device not only receives the first-type WUS from the network device to wake up the terminal device, but also receives the second-type WUS from the network device to wake up the terminal device. Resource overheads of the second-type WUS are less than those of the first-type WUS. In other words, the network device sends not only the first-type WUS but also the second-type WUS to the terminal device. Therefore, in this solution, a probability that the network device sends the first-type WUS to the terminal device is lower than a probability that the network device sends only the first-type WUS to the terminal device, thereby reducing resource overheads.

With reference to the first aspect, in a possible implementation, the method further includes: The terminal device receives first monitoring information from the network device, where the first monitoring information includes a monitoring periodicity of a first signal and/or a monitoring occasion in the monitoring periodicity; or the terminal device receives first monitoring information from the network device, where the first monitoring information includes a search space set corresponding to a first signal; and the terminal device determines a monitoring periodicity of the first signal and/or a monitoring occasion in the monitoring periodicity based on the search space set, where the first signal is the first-type WUS or the second-type WUS.

In this solution, the first monitoring information is received from the network device, so that the terminal device can determine an occasion on which first-type WUS monitoring or second-type WUS monitoring can be performed.

With reference to the first aspect, in a possible implementation, the first-type WUS further includes second monitoring information, where the second monitoring information is used to indicate, to the terminal device, a monitoring periodicity of a subsequent first-type WUS and/or a monitoring occasion in the monitoring periodicity; or the second monitoring information is used to indicate the terminal device to skip monitoring the first-type WUS in one or more subsequent monitoring periodicities of the first-type WUS.

In this solution, the first-type WUS carries new monitoring information used for first-type WUS monitoring, and the new monitoring information used for first-type WUS monitoring may no longer be sent through an RRC message, so that efficiency of obtaining, by the terminal device, the new monitoring information used for first-type WUS monitoring is improved, and the resource overheads can also be reduced to some extent.

With reference to the first aspect, in a possible implementation, the terminal device is configured with a long DRX cycle and a short DRX cycle, and the method further includes: The terminal device skips monitoring the first-type WUS in the short DRX cycle.

In this solution, skipping monitoring the first-type WUS in the short DRX cycle can reduce a possibility of sending the first-type WUS, to reduce the resource overheads.

With reference to the first aspect, in a possible implementation, the method further includes: When the terminal device is in an active state, the terminal device skips monitoring the second-type WUS, and does not skip monitoring the first-type WUS.

In this solution, skipping monitoring the second-type WUS when the terminal device is in the active state can reduce the energy consumption of the terminal.

With reference to the first aspect, in a possible implementation, the method further includes: The terminal device skips, under a first condition, monitoring the second-type WUS. The first condition is that the monitoring occasion of the second-type WUS is the same as the monitoring occasion of the first-type WUS; or a slot in which the monitoring occasion of the second-type WUS is located is the same as a slot in which the monitoring occasion of the first-type WUS is located; or a DRX cycle in which the monitoring occasion of the second-type WUS is located is the same as a DRX cycle in which the monitoring occasion of the first-type WUS is located.

This solution can ensure reception of the first-type WUS, and also ensure reception of the transmission energy consumption information included in the first-type WUS, to improve power saving performance of the terminal device as much as possible while ensuring a data transmission rate requirement.

With reference to the first aspect, in a possible implementation, the monitoring periodicity of the first-type WUS is greater than the monitoring periodicity of the second-type WUS; or a monitoring occasion set of the first-type WUS in a first time period is a subset of a monitoring occasion set of the second-type WUS in the first time period.

In this solution, the monitoring periodicity of the first-type WUS is greater than the monitoring periodicity of the second-type WUS; or the monitoring occasion set of the first-type WUS in the first time period is the subset of the monitoring occasion set of the second-type WUS in the first time period, so that the possibility of sending the first-type WUS is reduced, and the resource overheads may also be reduced while impact of frequently updating the transmission energy consumption information on a PDCCH monitoring and/or data transmission process.

With reference to the first aspect, in a possible implementation, the monitoring periodicity of the first-type WUS is N times the DRX cycle, the one or more DRX cycles corresponding to the first-type WUS are N consecutive DRX cycles, and N is an integer greater than or equal to 1; and/or the monitoring periodicity of the second-type WUS is M times the DRX cycle, the one or more DRX cycles corresponding to the second-type WUS are M consecutive DRX cycles, and M is an integer greater than or equal to 1.

In this solution, if N is greater than 1, when the first-type WUS corresponds to a plurality of DRX cycles, a quantity of times that the network device sends the first-type WUS may be reduced, thereby reducing the resource overheads. In this solution, if M is greater than 1, when the second-type WUS corresponds to a plurality of DRX cycles, a quantity of times that the network device sends the second-type WUS may be reduced, thereby reducing the resource overheads.

With reference to the first aspect, in a possible implementation, the first-type WUS further includes at least one of the following information: go-to-sleep GTS duration or a GTS pattern; scheduling information of the A-CSI-RS; scheduling information of an aperiodic sounding reference signal A-SRS; activation information of a search space set corresponding to the PDCCH monitoring; downlink bandwidth part BWP switching information and/or uplink BWP switching information; component carrier CC wake-up information; receive antenna information and/or transmit antenna information, where the receive antenna information is a quantity of receive antennas or a quantity of downlink transport layers, and the transmit antenna information is a quantity of transmit antennas or a quantity of uplink transport layers; or DRX configuration effectivity information.

In this solution, more transmission energy consumption information is carried in the first-type WUS, so that the power saving performance of the terminal device can be improved as much as possible while the data transmission rate requirement is ensured, and a delay caused by an RRC message reconfiguration is also reduced.

A second aspect provides a communication method, and the communication method includes:

A network device sends a first-type wake-up signal WUS to a terminal device, where the first-type WUS includes a first slot offset and/or a second slot offset. The first slot offset is a common minimum slot offset of a physical downlink shared channel PDSCH relative to a physical downlink control channel PDCCH for scheduling the PDSCH and an aperiodic channel state information reference signal A-CSI-RS relative to a PDCCH for scheduling the A-CSI-RS; and the second slot offset is a minimum slot offset of a physical uplink shared channel PUSCH relative to a PDCCH for scheduling the PUSCH. The first-type WUS indicates the terminal device to perform PDCCH monitoring in on duration of one or more discontinuous reception DRX cycles corresponding to the first-type WUS.

The A-CSI-RS in this solution not only includes a triggered CSI-RS used for channel measurement, but also includes a triggered CSI-RS used for interference measurement. In this solution, information included in the first-type WUS may be referred to as transmission energy consumption information.

In this solution, both a value of the first slot offset and a value of the second slot offset are in direct proportion to an energy consumption reduction that the terminal can achieve and in inverse proportion to a data transmission rate. Therefore, in this solution, the first slot offset and/or the second slot offset are/is carried in the first-type MIS. In addition, the first slot offset and/or the second slot offset that are/is carried in the first-type WUS are/is slot offsets and/or a slot offset that are/is determined by the network device based on a current data transmission rate requirement and that enable/ enables the terminal device to have optimal energy consumption reduction performance at a current data transmission rate. Therefore, after waking up based on the first-type WUS, the terminal device can immediately obtain a slot offset that enables, under the current data transmission rate requirement, the terminal device to have optimal energy consumption reduction performance, thereby reducing energy consumption of the terminal device.

With reference to the second aspect, in a possible implementation, the method further includes:

The network device sends a second-type WUS to the terminal device, where the second-type WUS includes wake-up information of a terminal device in a terminal group to which the terminal device belongs, where wake-up information of the terminal device indicates the terminal device to perform PDCCH monitoring in on duration of one or more DRX cycles corresponding to the second-type WUS.

In this solution, in addition to sending the first-type WUS to the terminal device to wake up the terminal device, the network device further sends the second-type WUS to the terminal device, to wake up the terminal device. Resource overheads of the second-type WUS are less than those of the first-type WUS. Therefore, a probability of sending the first-type WUS is lower than that of sending only the first-type WUS to the terminal device, thereby reducing resource overheads.

With reference to the second aspect, in a possible implementation, the method further includes: The network device sends first monitoring information to the terminal device, where the first monitoring information includes a monitoring periodicity of a first signal and/or a monitoring occasion in the monitoring periodicity; or the network device sends first monitoring information to the terminal device, where the first monitoring information includes a search space set corresponding to a first signal, and the search space set is used by the terminal device to determine a monitoring periodicity of the first signal and/or a monitoring occasion in the monitoring periodicity, where the first signal is the first-type WUS or the second-type WUS.

In this solution, the network device sends, to the terminal device, monitoring information used for first-type WUS monitoring and/or monitoring information used for second-type WUS monitoring, so that the terminal device can determine an occasion on which the first-type WUS monitoring and/or the second-type WUS monitoring can be performed.

With reference to the second aspect, in a possible implementation, the first-type WUS further includes second monitoring information, where the second monitoring information is used to indicate, to the terminal device, a monitoring periodicity of a subsequent first-type and/or a monitoring occasion in the monitoring periodicity; or the second monitoring information is used to indicate the terminal device to skip monitoring the first-type WUS in one or more subsequent monitoring periodicities of the first-type WUS.

In this solution, the first-type WUS carries new monitoring information used for first-type WUS monitoring, and then the new monitoring information used for first-type WUS monitoring does not need to be sent through an RRC message, so that efficiency of obtaining, by the terminal device, the new monitoring information used for first-type WUS monitoring is improved, and the resource overheads can also be reduced to sonic extent.

With reference to the second aspect, in a possible implementation, the monitoring periodicity of the first-type WUS is greater than the monitoring periodicity of the second-type WUS; or a monitoring occasion set of the first-type WUS in a first time period is a subset of a monitoring occasion set of the second-type WUS in the first time period.

In this solution, the monitoring periodicity of the first-type WUS is greater than the monitoring periodicity of the second-type WUS; or the monitoring occasion set of the first-type WUS in the first time period is the subset of the monitoring occasion set of the second-type WUS in the first time period, so that the possibility of sending the first-type WUS is reduced, and the resource overheads may also be reduced while impact of frequently updating the transmission energy consumption information on a PDCCH monitoring and/or data transmission process.

With reference to the second aspect, in a possible implementation, the first-type WUS further includes at least one of the following: go-to-sleep GTS duration or a GTS pattern; scheduling information of the A-CSI-RS; scheduling information of an aperiodic sounding reference signal A-SRS; activation information of a search space set corresponding to the PDCCH monitoring; downlink bandwidth part BWP switching information and/or uplink BWP switching information; component carrier CC wake-up information; receive antenna information and/or transmit antenna information, where the receive antenna information is a quantity of receive antennas or a quantity of downlink transport layers, and the transmit antenna information is a quantity of transmit antennas or a quantity of uplink transport layers; or DRX configuration effectivity information.

In this solution, more transmission energy consumption information is carried in the first-type WUS, so that power saving performance of the terminal device can be improved as much as possible while the data transmission rate requirement is ensured, and a delay caused by RRC message reconfiguration is also reduced.

A third aspect provides a communications apparatus. The communications apparatus may be a terminal device, or may be a chip in a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs a corresponding function in the first aspect. When the apparatus is a chip in a terminal device, the processing unit may be a processor, and the transceiver unit may be an input/output interface, a pin, a circuit, or the like. The processing unit executes an instruction stored in a storage unit, so that the terminal device performs a corresponding function in the first aspect. The storage unit may be a storage unit (for example, a register or a cache) in the chip, or may be a storage unit (for example, a read-only memory or a random access memory) that is outside the chip and that is in the terminal device.

A fourth aspect provides a communications apparatus. The communications apparatus may be a network device, or may be a chip in a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs a corresponding function in the first aspect. When the apparatus is a chip in a network device, the processing unit may be a processor, and the transceiver unit may be an input/output interface, a pin, a circuit, or the like. The processing unit executes an instruction stored in a storage unit, so that the network device performs a corresponding function in the first aspect. The storage unit may be a storage unit (for example, a register or a cache) in the chip, or may be a storage unit (for example, a read-only memory or a random access memory) that is outside the chip and that is in the network device.

A fifth aspect provides a communications apparatus. The apparatus includes a processor and a storage medium. The storage medium stores an instruction. When the instruction is run by the processor, the processor is enabled to perform the method in any one of the first aspect or the possible implementations of the first aspect, or the processor is enabled to perform the method in any one of the second aspect or the possible implementations of the second aspect.

A sixth aspect provides a readable storage medium. The readable storage medium stores a computer program. When the computer program is executed, the method in any one of the first aspect or the possible implementations of the first aspect is implemented, or the method in any one of the second aspect or the possible implementations of the second aspect is implemented.

A seventh aspect provides a computer program product. The computer program product includes computer program code. When the computer program code is run on a communications device, the communications device is enabled to perform the method in any one of the first aspect or the possible implementations of the first aspect, or the communications device is enabled to perform the method in any one of the second aspect or the possible implementations of the second aspect, In this application, both the value of the first slot offset and the value of the second slot offset are in direct proportion to the energy consumption reduction that the terminal can achieve and in inverse proportion to the data transmission rate. Therefore, in this solution, the first slot offset and/or the second slot offset are/is carried in the first-type WUS. In addition, the first slot offset and/or the second slot offset that are/is carried in the first-type WUS are/is the slot offsets and/or the slot offset that are/is determined by the network device based on the current data transmission rate requirement and that enable/enables the terminal device to have optimal energy consumption reduction performance at the current data transmission rate. Therefore, after waking up based on the first-type WUS, the terminal device can immediately obtain the slot offset that enables, under the current data transmission rate requirement, the terminal device to have optimal energy consumption reduction performance, thereby reducing the energy consumption of the terminal device.

DESCRIPTION OF EMBODIMENTS

In this application, "at least one" refers to one or more, and "a plurality of" refers to two or more. The term "and/or"

describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one (one piece) of a, b, or c may represent: a, b, c, a-b, a-c, b-c, or a-b-c. There may be one single piece of a, b, or c, or there may be a plurality of pieces of a, b, or c. In this application, the terms "first", "second", and the like are used to distinguish between similar objects but do not necessarily indicate a specific order or sequence.

To better understand this application, the following elements are introduced in this application.

Figure 1:
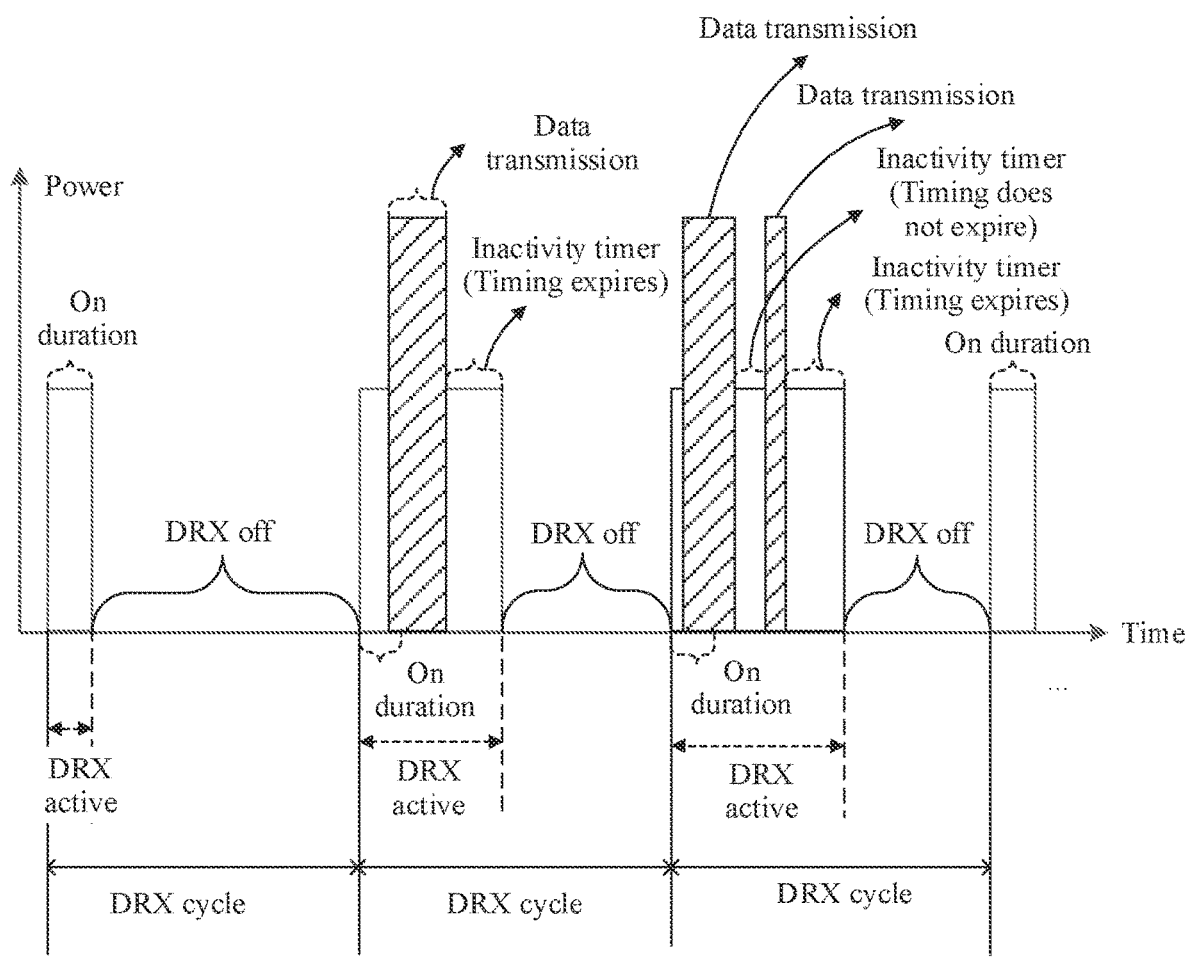
FIG. 1 is a schematic diagram of a DRX mechanism according to an embodiment of this application.

A DRX mechanism is first described with reference to FIG. 1. FIG. 1 is a schematic diagram of a DRX mechanism according to an embodiment of this application.

DRX is divided into different DRX cycles (DRX cycle) in terms of time, and a start location in a DRX cycle is a start of on duration (on duration). In the on duration, an on duration timer (on duration timer) counts, and a terminal device performs PDCCH monitoring (PDCCH monitoring). If no uplink or downlink data scheduling is detected in the PDCCH monitoring in the on duration, the terminal device is in a DRX off state (DRX off state) in the DRX cycle other than the on duration, and does not perform PDCCH monitoring, to save power, as shown in the $1^{st}$ DRX cycle in FIG. 1. That the terminal device is in a DRX off state means that the terminal device is in a sleep state.

If the terminal device detects newly transmitted downlink data or uplink data during the PDCCH monitoring, an inactivity timer (inactivity timer) is enabled or restarted, During inactivity tuner timing, the terminal device performs PDCCH monitoring as the terminal device does in the on duration. A time in which the on duration timing, the inactivity timer timing, or other cases (for example, retransmission timer timing, where these "other cases" are not provided in this application) are performed is a DRX active time (DRX active time), and the terminal device needs to perform PDCCH monitoring in the DRX active time, as shown in the $2^{nd}$ DRX cycle and the $3^{rd}$ DRX cycle in FIG. 1, In the DRX active time, the terminal device is in an active state.

When both the on duration timer and the inactivity timer stop timing (where it is assumed that timing is also stopped in other cases, for example, a retransmission timer also stops timing), the terminal device enters a DRX off state (namely, the DRX inactive time), and does not perform PDCCH monitoring any longer, as shown in the $2^{nd}$ DRX cycle and the $3^{rd}$ DRX cycle in FIG. 1.

DRX configuration information: The DRX configuration information includes at least one of the following DRX parameters: a DRX cycle, a start offset, total timing duration of an on duration timer, total timing duration of an inactivity timer, total timing duration of a retransmission timer, or the like. The DRX configuration information may be semi-statically configured by using a radio resource control (Radio Resource Control, RRC for short) message. When the DRX configuration information includes {DRX cycle, total timing duration of the inactivity timer, total timing duration of the on duration timer}, some typical configuration examples are {160 ms, 100 ms, 8 ms}, {320 ms, 80 ms, 10 ms}, and the like.

Figure 2:
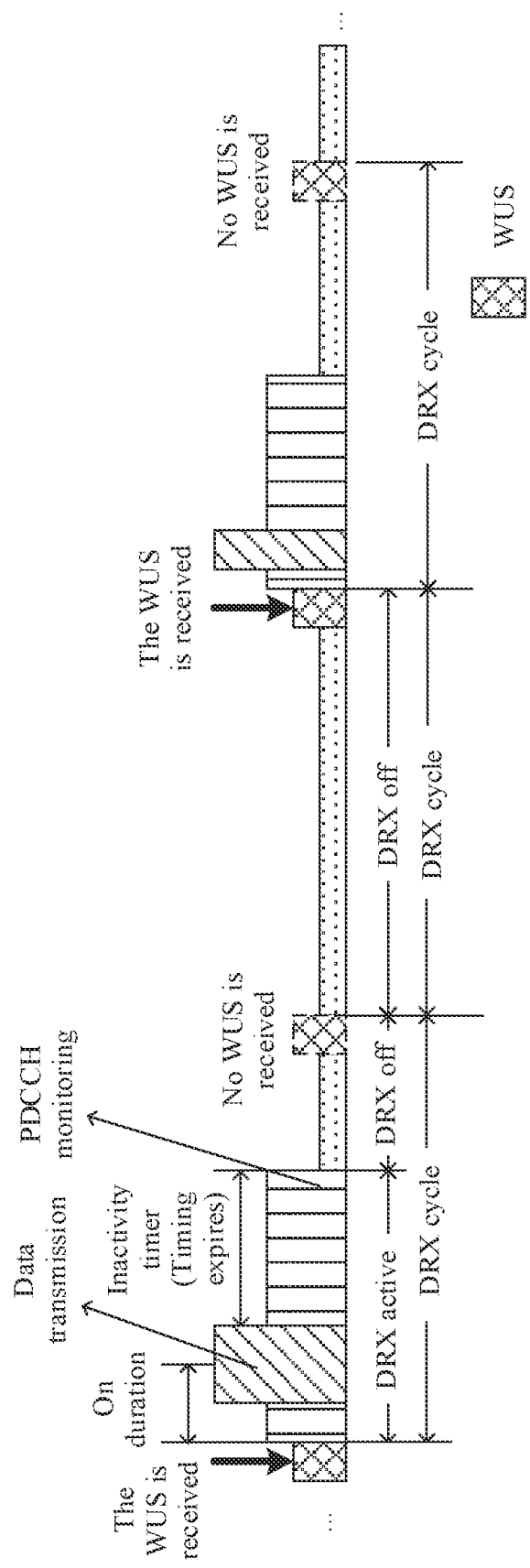
FIG. 2 is a schematic diagram of awakening a terminal device through a WUS according to an embodiment of this application.

Next, a wake-up signal (Wake-Up Signal, WUS for short) is described with reference to FIG. 2. FIG. 2 is an example diagram of a WUS according to an embodiment of this application.

The WUS is a downlink signal sent by a network device to a terminal device, and a sending location of the WUS is usually considered as a location before on duration of a DRX cycle or a start location of on duration of a DRX cycle. If the network device sends a WUS, and the WUS is detected by the terminal device, the terminal device wakes up in on duration of a corresponding DRX cycle to perform PDCCH monitoring. Otherwise, the terminal device does not wake up, continues to sleep, and skips the DRX cycle, as shown in FIG. 2.

Based on the DRX, the WUS is introduced to reduce a possibility that the terminal device wakes up to perform PDCCH monitoring, and to further save power.

Then, scheduling, on a PDCCH, a physical downlink shared channel (physical downlink shared channel, PDSCH for short), a physical uplink shared channel (physical uplink shared channel, PUSCH for short), and an aperiodic channel state information reference signal (aperiodic channel state information-reference signals, A-CSI-RS for short) is described with reference to FIG. 3 to FIG. 5. The A-CSI-RS in this application not only includes a triggered CSI-RS used for channel measurement, but also includes a triggered CSI-RS used for interference measurement.

Figure 3:
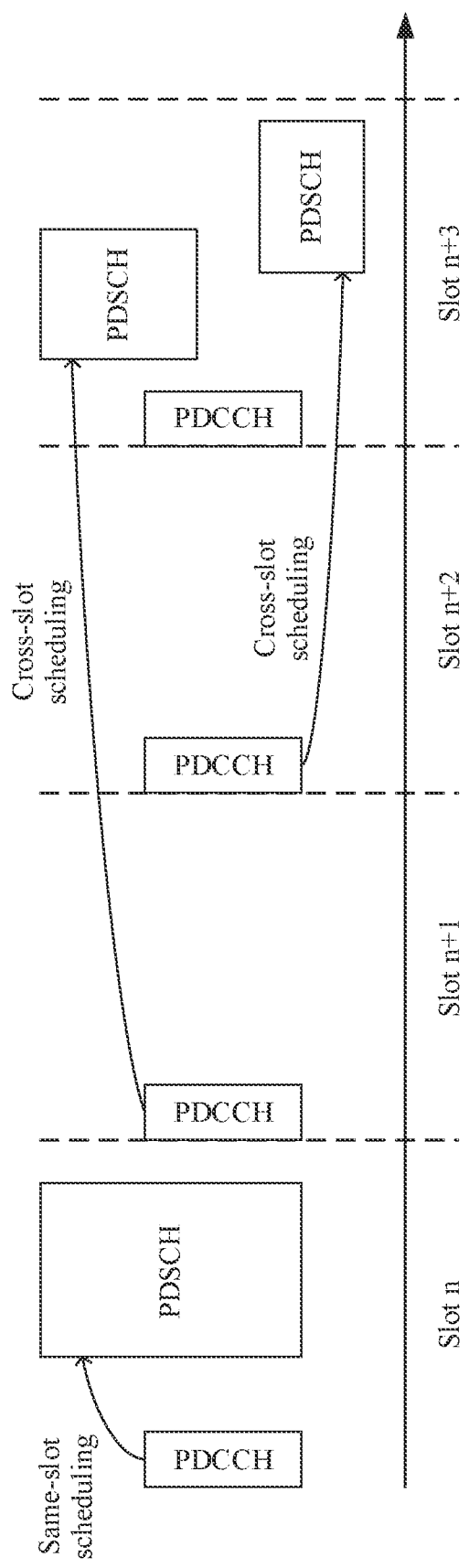
FIG. 3 is a schematic diagram of same-slot scheduling and cross-slot scheduling according to an embodiment of this application.

FIG. 3 is a schematic diagram of same-slot scheduling and cross-slot scheduling (cross-slot scheduling) according to an embodiment of this application. FIG. 4 is a schematic diagram of energy consumption of a terminal device during same-slot scheduling according to an embodiment of this application. FIG. 5 is a schematic diagram of energy consumption of a terminal device during cross-slot scheduling according to an embodiment of this application.

Specifically, compared with the same-slot scheduling, the cross-slot scheduling is more beneficial to power saving of a terminal device. Specific principles are shown in FIG. 4 and FIG. 5, FIG. 4 and FIG. 5 both show a case in which no data is scheduled on a PDCCH. For the same-slot scheduling, because the terminal device cannot learn, in a PDCCH monitoring time (to be specific, before downlink control information (Downlink Control Information, DCI for short) is obtained through decoding), whether data in this period of time is scheduled, the terminal device needs to buffer reception of downlink data in this period of time, and keep a front-end module such as a radio frequency module on; and therefore, the terminal device consumes more energy. However, for the cross-slot scheduling, because the terminal device already knows, at least one slot in advance, that there is no scheduling in a current slot, a front-end module such as a downlink data radio frequency module may be turned off in a PDCCH decoding time, and a downlink data reception buffer may also be turned off, to save power of the terminal device, that is, reduce energy consumption of the terminal.

A slot offset of a PDSCH relative to a PDCCH for scheduling the PDSCH is a parameter K0, and K0 is one of parameters in a group of PDSCH candidate time domain resources configured through RRC. A minimum value $K0_{min}$ of K0 in this group of candidate time domain resources determines whether the terminal device can perform PDCCH monitoring based on the cross-slot scheduling, and $K0_{min}$ is a minimum slot offset of the PDSCH relative to the PDCCH for scheduling the PDSCH. If $K0_{min}$ is 1 or greater, the terminal device may decode the PDCCH and/or turn off a downlink data receiving module based on cross-slot scheduling, thereby saving more power. Otherwise, if K0 in the group of candidate time domain resources includes K0=0, power cannot be saved.

In addition to PDSCH scheduling, A-CSI-RS scheduling is also related to the downlink data reception buffer. Similar to the PDSCH scheduling, during the A-CSI-RS scheduling, in a candidate time domain resource of the A-CSI-RS, a minimum slot offset A-CSI-RS-slotOffset$_{min}$ of the A-CSI-RS relative to a PDCCH for scheduling the A-CSI-RS also determines whether PDCCH monitoring can be performed based on the cross-slot scheduling, to save power. Therefore, min{K0$_{min}$, A-CSI-RS-slotOffset$_{min}$} greatly affects power consumption of the terminal device. A requirement for faster PDCCH monitoring decoding indicates higher power consumption. Therefore, larger min{K0$_{min}$, A-CSI-RS-slotOffset$_{min}$} indicates lower power consumption of the terminal device.

Figure 4:
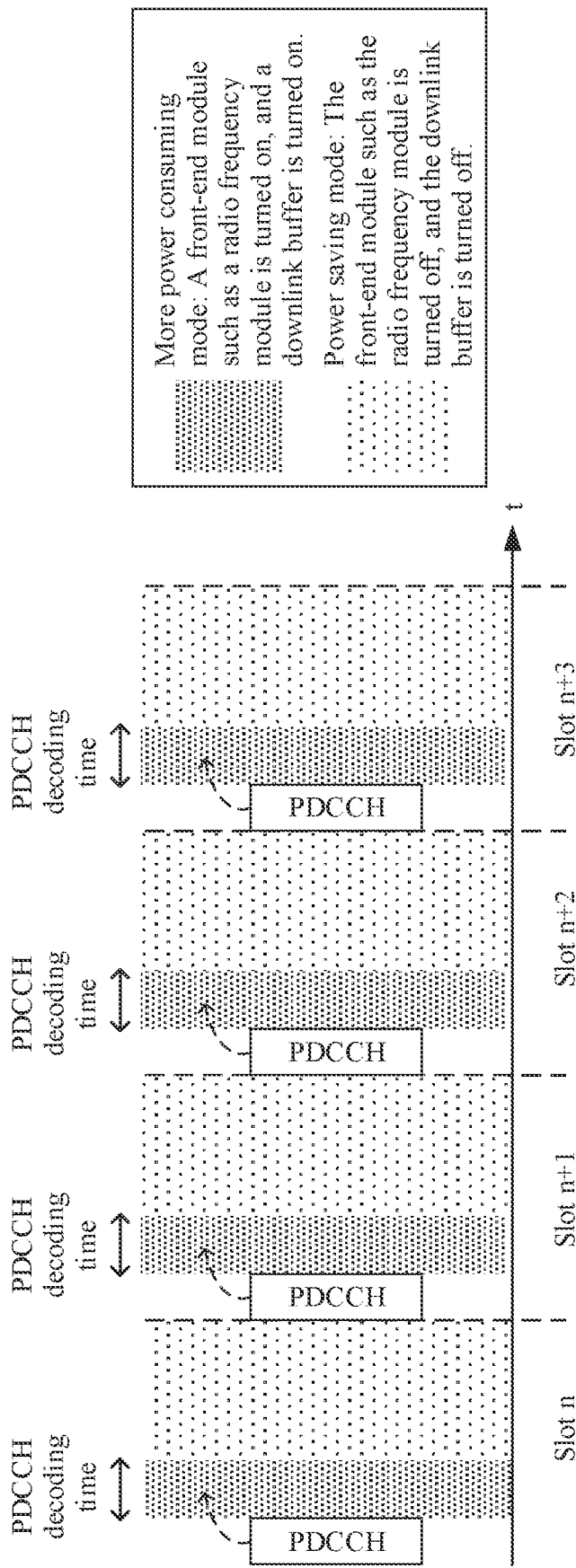
FIG. 4 is a schematic diagram of energy consumption of a terminal device during same-slot scheduling according to an embodiment of this application.
Figure 5:
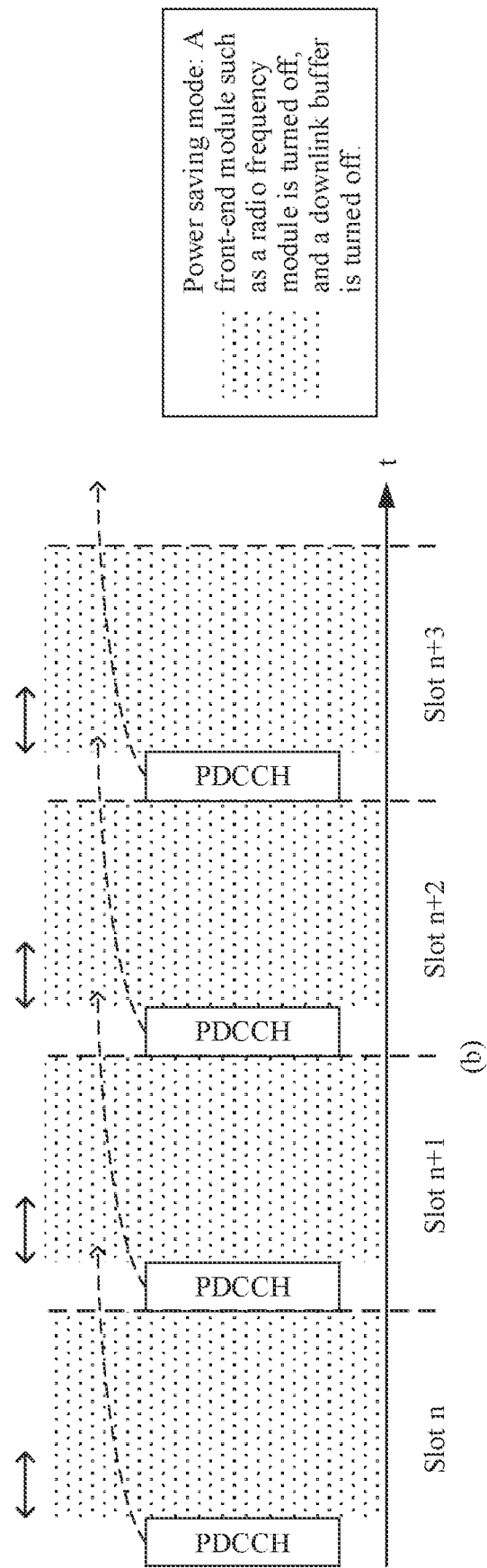
FIG. 5 is a schematic diagram of energy consumption of a terminal device during cross-slot scheduling according to an embodiment of this application.

In addition to the downlink buffers shown in FIG. 4 and FIG. 5, a slot offset K2 between the PUSCH and the PDCCH for scheduling the PUSCH also affects the power consumption of the terminal device, where K2 is one of parameters in a PUSCH candidate time domain resource configured through RRC. Based on the same foregoing principle, larger K2$_{min}$ indicates lower power consumption of the terminal device. Similar to K0, if K2$_{min}$ is 1 or greater, the terminal device may decode the PDCCH based on the cross-slot scheduling, thereby saving more power. Otherwise, if K2 in the group of candidate time domain resources includes K2=0, power cannot be saved.

However, if min{K0$_{min}$, A-CSI-RS-slotOffset$_{min}$} or K2$_{min}$ is larger, not only the power consumption of the terminal device is reduced, but also a downlink or uplink data transmission rate is reduced. Therefore, the terminal device needs to obtain appropriate min{K0$_{min}$, A-CSI-RS-slotOffset$_{min}$} and/or K2$_{min}$, so that energy consumption reduction performance of the terminal device is optimal if it is ensured that a data transmission rate satisfies a requirement.

In the current technology, a candidate time domain resource of a PDSCH, a candidate time domain resource of an A-CSI-RS, and a candidate time domain resource of a PUSCH are all semi-statically configured through RRC. Therefore, min{K0$_{min}$, A-CSI-RS-slotOffset$_{min}$} and K2$_{min}$ obtained based on these semi-static candidate time domain resources are also semi-static. However, the candidate time domain resource of the PDSCH, the candidate time domain resource of the A-CSI-RS, and the candidate time domain resource of the PUSCH that are carried in RRC are usually obtained based on a previous data transmission rate requirement. Therefore, after waking up based on a WUS, the terminal device satisfies a current data transmission rate requirement, and impact of min{K0$_{min}$, A-CSI-RS-slotOffset$_{min}$} and K2$_{min}$ carried in an RRC message on energy consumption of the terminal device may be further optimized. In this case, the terminal device needs to obtain, only from an RRC reconfiguration message, min{K0$_{min}$, A-CSI-RS-slotOffset$_{min}$} and K2$_{min}$ that enable, under the current data transmission rate requirement, the energy consumption of the terminal device to be the minimum. In other words, after waking up based on the WUS, the terminal device may not immediately receive or send data by using min{K0$_{min}$, A-CSI-RS-slotOffset$_{min}$} and K2$_{min}$ that enable, under the current data transmission rate requirement, the energy consumption of the terminal device to be the minimum.

To resolve the technical problem, a communication method in this application is provided.

The following describes technical solutions of this application with reference to the accompanying drawings.

It should be understood that the technical solutions in the embodiments of this application may be used for a long term evolution (Long Term Evolution, LTE) architecture, or may be used for a universal mobile telecommunications system (Universal Mobile Telecommunications System, UMTS) terrestrial radio access network (UMTS Terrestrial Radio Access Network, UTRAN) architecture, or a global system for mobile communications (Global System for Mobile Communication, GSM)/enhanced data rates for GSM evolution (Enhanced Data Rate for GSM Evolution, EDGE) system radio access network (GSM EDGE Radio Access Network, GERAN) architecture. In the UTRAN architecture or the GERAN architecture, a function of an MME is completed by a serving general packet radio service (General Packet Radio Service, GPRS) support node (Serving GPRS Support, SGSN), and a function of an SGW/a PGW is completed by a gateway GPRS support node (Gateway GPRS Support Node, GGSN). The technical solutions in the embodiments of this application may be further used in another communications system, such as a public land mobile network (Public Land Mobile Network, PLMN) system, even a 5G communications system or a post-5G communications system and the like. This is not limited in the embodiments of this application.

A terminal device is provided in the embodiments of this application. The terminal device may include a wireless transceiver function and can cooperate with a network device to provide a communication service for a user. Specifically, the terminal device may be user equipment (User Equipment, UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. For example, the terminal device may be a cellular phone, a cordless phone, a session initiation protocol (Session Initiation Protocol, SIP) phone, a wireless local loop (Wireless Local Loop, WLL) station, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, or a terminal device in a 5G network or a post-5G network. No limitation is imposed in the embodiments of this application.

A network device is further provided in the embodiments of this application. The network device may be a device configured to communicate with a terminal device. For example, the network device may be a base transceiver station (Base Transceiver Station, BTS) in a GSM system or a CDMA system, may be a NodeB (NodeB, NB) in a WCDMA system, or may be an evolved NodeB (Evolutional Node B, eNB or eNodeB) in an LTE system. Alternatively, the network device may be a relay station, an access point, a vehicle-mounted device, a wearable device, a network-side device in a 5G network or a post-5G network, a network device in a future evolved PLMN network, or the like.

The network device in the embodiments of this application may also be referred to as a radio access network (Radio Access Network, RAN) device. The RAN device is connected to the terminal device, to receive data from the terminal device and send the data to a core network device. The RAN device corresponds to different devices in different communications systems, for example, corresponds to a base station and a base station controller in a 2G system, corresponds to a base station and a radio network controller (Radio Network Controller, RNC) in a 3G system, corresponds to an evolved NodeB (Evolutional Node B, eNB) in a 4G system, and in a 5G system, corresponds to an access network device (for example, a gNB, a CU, or a DU) in the 5G system such as a new radio access system (New Radio Access Technology, NR).

Figure 6:
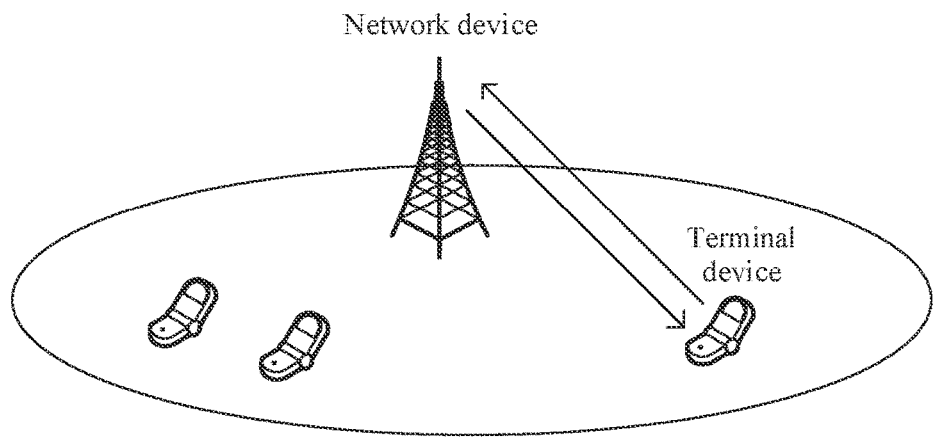
FIG. 6 is a schematic diagram of a system architecture according to an embodiment of this application.

FIG. 6 is a schematic diagram of a system architecture according to an embodiment of this application. As shown in FIG. 6, the system architecture includes a network device and a terminal device.

The following describes the communication methods in this application by using specific embodiments.

Figure 7:
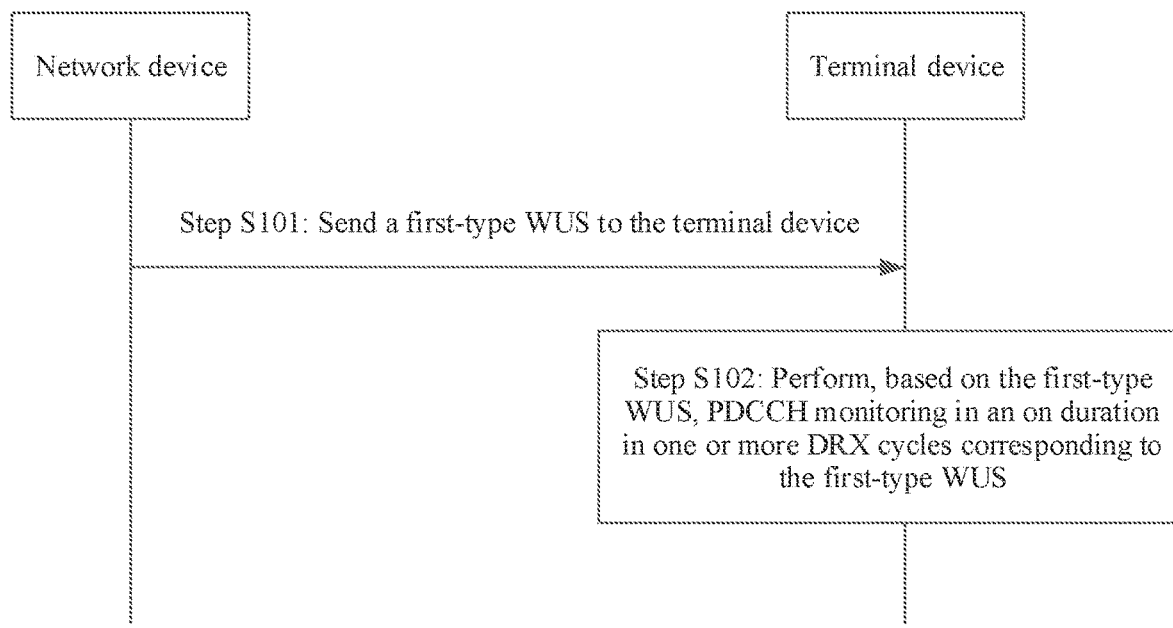
FIG. 7 is a signaling interworking diagram 1 according to an embodiment of this application.

FIG. 7 is a signaling interworking diagram 1 according to an embodiment of this application. Referring to FIG. 7, a method in this embodiment includes the following steps.

Step S101: A network device sends a first-type WUS to a terminal device.

Specifically, the network device sends the first-type WUS to the terminal device, where the first-type WUS includes a first slot offset and/or a second slot offset.

For the first slot offset: The first slot offset is a common minimum slot offset of a PDSCH relative to a PDCCH for scheduling the PDSCH and an A-CSI-RS relative to a PDCCH for scheduling the A-CSI-RS.

Specifically, there are one or more common minimum slot offsets of the PDSCH relative to the PDCCH: for scheduling the PDSCH and the A-CSI-RS relative to the PDCCH for scheduling the A-CSI-RS. For ease of description, in this embodiment, the one or more common minimum slot offsets of the PDSCH relative to the PDCCH for scheduling the PDSCH and the A-CSI-RS relative to the PDCCH for scheduling the A-CSI-RS are referred to as one or more lower limit slot offsets. The first slot offset carried in the first-type WUS is one of the one or more lower limit slot offsets.

For a first lower limit slot offset in the one or more lower limit slot offsets, the PDSCH may correspond to one time domain resource allocation list, and the PDSCH time domain resource allocation list includes one or more slot offsets of the PDSCH relative to the PDCCH for scheduling the PDSCH. In addition, the one or more slot offsets, included in the time domain resource allocation list, of the PDSCH relative to the PDCCH for scheduling the PDSCH are all greater than or equal to the first lower limit slot offset. There are one or more lower limit slot offsets. Therefore, the PDSCH may correspond to one or more time domain resource allocation lists. In other words, each lower limit slot offset corresponds to one PDSCH time domain resource allocation list.

For the first lower limit slot offset in the one or more lower limit slot offsets, the A-CSI-RS may correspond to one aperiodic CSI triggering state list, and the aperiodic CSI triggering state list includes one or more slot offsets of the A-CSI-RS relative to the PDCCH for scheduling the A-CSI-RS. In addition, the one or more slot offsets, included in the aperiodic CSI triggering state list, of the A-CSI-RS relative to the PDCCH for scheduling the A-CSI-RS are all greater than or equal to the first lower limit slot offset. There are one or more lower limit slot offsets. Therefore, the A-CSI-RS may correspond to one or more aperiodic CSI triggering state lists. In other words, each lower limit slot offset corresponds to one aperiodic CSI triggering state list.

The one or more time domain resource allocation lists of the PUSCH may be configured by the network device for the terminal device by sending an RRC message to the terminal device. The one or more aperiodic CSI triggering state lists of the A-CSI-RS may be configured by the network device for the terminal device by sending an RRC message to the terminal device. The one or more lower limit slot offsets may be configured by the network device for the terminal device by sending an RRC message or a system message to the terminal device, or may be predefined in a protocol. Optionally, each lower limit slot offset has one index.

For the second slot offset: The second slot offset is a minimum slot offset of a PUSCH relative to a PDCCH for scheduling the PUSCH.

Specifically, there are one or more minimum slot offsets of the PUSCH relative to the PDCCH for scheduling the PUSCH. The second slot offset carried in the first-type WUS is one of the one or more minimum slot offsets of the PUSCH relative to the PDCCH for scheduling the PUSCH.

For one of the one or more minimum slot offsets of the PUSCH relative to the PDCCH for scheduling the PUSCH, the PUSCH may correspond to one time domain resource allocation list, and the time domain resource allocation list includes one or more slot offsets of the PUSCH relative to the PDCCH for scheduling the PUSCH. In addition, the one or more slot offsets, included in the time domain resource allocation list, of the PUSCH relative to the PDCCH for scheduling the PUSCH are all greater than or equal to the minimum slot offset. Because there are one or more minimum slot offsets of the PUSCH relative to the PDCCH for scheduling the PUSCH, the PUSCH may correspond to one or more time domain resource allocation lists. In other words, each minimum slot offset corresponds to one PUSCH time domain resource allocation list.

The one or more time domain resource allocation lists of the PUSCH may be configured by the network device for the terminal device by sending an RRC message to the terminal device. The one or more minimum slot offsets may be configured by the network device for the terminal device by sending an RRC message or a system message to the terminal device, or may be predefined in a protocol. Optionally, each minimum slot offset of the PUSCH relative to the PDCCH for scheduling the PUSCH has one index.

In addition, the first-type WUS may further include at least one of the following information:

(1) Go-to-sleep (go-to-sleep, GTS for short) duration information or GTS pattern information.

Specifically, the terminal device may correspond to one or more GTS pieces of duration or one or more GTS patterns. The GTS duration is used to indicate sleep duration of the terminal device, and the GIS pattern is used to indicate a sleep manner of the terminal device. For example, the GTS pattern may be that, in duration of K ms, the terminal device sleeps in first k ms, and does not sleep in last (K−k) ms, where k<K.

The at least one piece of GTS duration may be configured by the network device for the terminal device by sending an RRC message or a system message to the terminal device, or may be agreed on in a protocol. Optionally, each piece of GTS duration corresponds to one index. The at least one GTS pattern may be configured by the network device for the terminal device by sending an RRC message or a system message to the terminal device, or may be agreed on in a protocol. Optionally, each GTS pattern corresponds to one index.

When the first-type WUS includes the GTS duration, the GTS duration included in the first-type WUS is one of the at least one piece of GIS duration. When the first-type WUS includes the GIS pattern, in one manner, the GIS pattern information included in the first-type WUS is an index of one of the at least one GTS pattern.

For example, the GTS duration may be 2 ms, 4 ms, 8 ms, 10 ms, or the like. When the GTS duration is 2 ms, the GTS duration indicates the terminal device to sleep for 2 ms. The GTS pattern may be that, in the duration of 10 ms, the terminal device sleeps in first 2 ms and does not sleep in last S ms.

(2) Scheduling information of the A-CSI-RS.

Specifically, the terminal device may correspond to scheduling information of one or more A-CSI-RSs. The scheduling information of the one or more A-CSI-RSs may be configured by the network device for the terminal device by sending an RRC message to the terminal device. Optionally, scheduling information of each A-CSI-RS corresponds to one index.

When the first-type WUS includes the scheduling information of the A-CSI-RS, in one manner, the scheduling information of the A-CSI-RS included in the first-type WUS is an index of one piece of scheduling information in the scheduling information of the one or more A-CSI-RSs.

(3) Scheduling information of an aperiodic sounding reference signal (aperiodic sounding reference signal, A-SRS for short).

Specifically, the terminal device may correspond to scheduling information of one or more A-SRSs. The scheduling information of the one or more A-SRSs may be configured by the network device for the terminal device by sending an RRC message to the terminal device. Optionally, scheduling information of each A-SRS corresponds to one index.

When the first-type WUS includes the scheduling information of the A-SRS, in one manner, the scheduling information of the A-SRS included in the first-type WUS is an index of one piece of scheduling information in the scheduling information of the one or more A-SRSs.

(4) Activation information of a search space set corresponding to PDCCH monitoring.

Specifically, the terminal device may correspond to activation information of a search space set corresponding to one or more times of PDCCH monitoring.

For example, the network device configures, for the terminal device, eight search space sets that can be activated by the first-type WUS. Activation information of a search space set corresponding to PDCCH monitoring may be represented by using a bitmap. When the activation information of the search space set corresponding to the PDCCH monitoring is "11110010", it indicates that the $1^{st}$ to the $4^{th}$ search space sets and the $7^{th}$ search space set are activated. That the first-type WUS activates a search space set means that the first-type WUS includes information for activating the search space set, and the terminal device performs PDCCH monitoring based on the search space set.

The activation information of the search space set corresponding to the one or more times of PDCCH monitoring may be configured by the network device for the terminal device by sending an RRC message to the terminal device. Optionally, activation information of a search space set corresponding to each time of PDCCH monitoring corresponds to one index.

When the first-type WUS includes the activation information of the search space set corresponding to the PDCCH monitoring, in one manner, the activation information of the search space set corresponding to the PDCCH monitoring included in the first-type WUS is an index of one piece of activation information in the activation information of the search space set corresponding to the one or more times of PDCCH monitoring.

(5) Downlink bandwidth part (bandwidth part, BWP for short) switching information and/or uplink BWP switching information.

Specifically, the terminal device may correspond to one or more downlink BWPs and/or one or more uplink BWPs. Switching information of the one or more downlink BWPs may be configured by the network device for the terminal device by sending an RRC message or a system message to the terminal device, or may be agreed on in a protocol. Switching information of the one or more uplink BWPs may be configured by the network device for the terminal device by sending an RRC message or a system message to the terminal device, or may be agreed on in a protocol. Optionally, each downlink BWP corresponds to one index and/or each uplink BWP corresponds to one index.

When the first-type WUS includes the downlink BWP switching information, in one manner, the downlink BWP switching information included in the first-type WUS is an index of one of the one or more downlink BWPs, and indicates switching to the downlink BWP indicated by the index. When the first-type WUS includes the uplink BWP switching information, in one manner, the uplink BWP switching information included in the first-type WUS is an index of one of the one or more uplink BWPs, and indicates switching to the uplink BWP indicated by the index.

(6) Component carrier (component carrier, CC for short) wake-up information.

Specifically, the terminal device may correspond to one or more CCs. The one or more CCs may be configured by the network device for the terminal device by sending an RRC message or a system message to the terminal device, or may be agreed on in a protocol. Optionally, each CC corresponds to one index.

When the first-type WUS includes the CC wake-up information, in one manner, the CC wake-up information included in the first-type WUS is an index of a CC that needs to be awakened in the one or more CCs. The CC wake-up information indicates a CC on which the terminal device needs to perform PDCCH monitoring.

(7) Receive antenna information and/or transmit antenna information, where the receive antenna information is a quantity of receive antennas or a quantity of downlink transport layers, and the transmit antenna information is a quantity of transmit antennas or a quantity of uplink transport layers.

Specifically, the terminal device may correspond to one or more pieces of receive antenna information and/or one or more pieces of transmit antenna information. The one or more pieces of transmit antenna information may be configured by the network device for the terminal device by sending an RRC message or a system message to the terminal device, or may be agreed on in a protocol. Optionally, each piece of transmit antenna information corresponds to one index. The one or more pieces of transmit antenna information may be configured by the network device for the terminal device by sending an RRC message or a system message to the terminal device, or may be agreed on in a protocol. Optionally, each piece of transmit antenna information corresponds to one index.

When the first-type WUS includes the quantity of receive antennas, in one manner, the quantity of receive antennas included in the first-type WUS is an index of one of one or more quantities of receive antennas. When the first-type WUS includes the quantity of transmit antennas, the quantity of transmit antennas included in the first-type WUS is an index of one of one or more quantities of transmit antennas.

(8) DRX configuration effectivity information.

Specifically, the terminal device may correspond to one or more pieces of DRX configuration information. The one or more pieces of DRX configuration information may be configured by the network device for the terminal device by sending an RRC message to the terminal device. Optionally, each piece of DRX configuration information corresponds to one index.

When the first-type WUS includes DRX configuration effectivity information, in one manner, the DRX configuration effectivity information included in the first-type WUS is an index of one of the one or more pieces of DRX configuration information.

In conclusion, information included in the first-type WUS may be referred to as transmission energy consumption information.

As described above, each piece of information in each type of transmission energy consumption information may correspond to one index, in another manner, alternatively, one group of information may correspond to one joint index, the group of information includes at least one piece of transmission energy consumption information, and each piece of information in the group of information is in a different type. For example, one group of information includes: a first slot offset 1, a second slot offset 3, and activation information 11110010 of a search space set corresponding to PDCCH monitoring. The joint index of the group of information may be configured as two bits "01".

If one group of information corresponds to one joint index and the group of information is information that needs to be indicated by the first-type WUS, the first-type WUS may include the joint index of the group of information. Further, the first-type WUS may be a dedicated WUS corresponding to the terminal, or the first-type WUS may be a WUS sent to each terminal device in a terminal group to which the terminal device belongs. The terminal group includes one or more terminals, and the terminal group includes the terminal device. The first-type WUS includes a joint index corresponding to each terminal in the terminal group, and the joint index corresponding to each terminal indicates the transmission energy consumption information of the terminal device.

The transmission energy consumption information is carried in the first-type WUS, so that power saving performance of the terminal device can be improved as much as possible while a data transmission rate requirement is ensured, and a delay caused by an RRC message reconfiguration is also reduced.

Step S102: The terminal device performs, based on the first-type WUS, PDCCH monitoring in on duration of one or more DRX cycles corresponding to the first-type WUS.

Specifically, the terminal device receives the first-type WUS, and performs PDCCH monitoring based on the first-type WUS in the on duration of the one or more DRX: cycles corresponding to the first-type WUS. In other words, after receiving the first-type WUS, the terminal device wakes up in the on duration of the one or more DRX cycles corresponding to the first-type WUS, to perform PDCCH monitoring.

The following describes the one or more DRX cycles corresponding to the first-type WUS.

It may be understood that the terminal device may perform periodic monitoring on the first-type WUS, and a moment of monitoring the first-type WUS is referred to as a monitoring occasion. In one manner, a monitoring periodicity of the first-type WUS is N times the DRX and the one or more DRX cycles corresponding to the first-type WUS are N consecutive DRX cycles, that is, the first-type WUS corresponds to N consecutive DRX cycles. It may be understood that when N=1, the first-type WUS corresponds to one DRX cycle, and when N is greater than 1, the first-type WUS corresponds to a plurality of DRX cycles. When the first-type WUS corresponds to the plurality of DRX cycles, a quantity of times that the network device sends the first-type WUS may be reduced, thereby reducing resource overheads.

Figure 8:
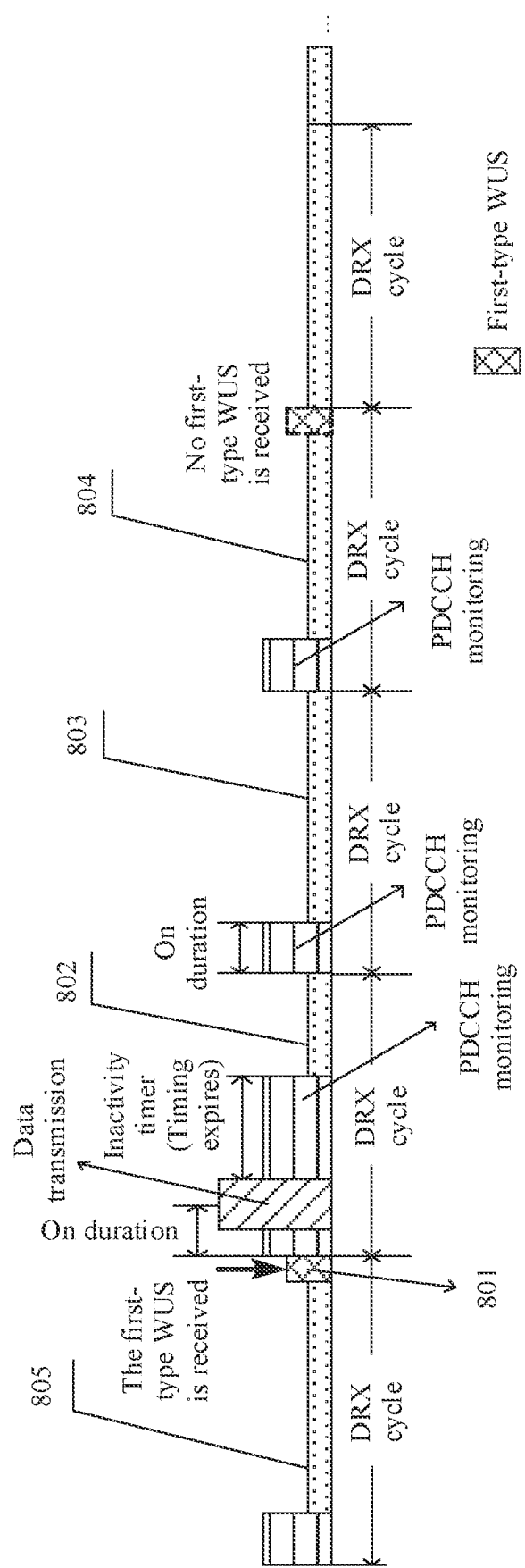
FIG. 8 is a schematic diagram of a DRX: cycle corresponding to a first-type WUS according to an embodiment of this application.

FIG. 8 is a schematic diagram of a DRX cycle corresponding to a first-type WUS according to an embodiment of this application. Referring to FIG. 8, a monitoring periodicity of the first-type WUS is three DRX cycles. In this case, PDCCH monitoring is performed, in the monitoring periodicity of the first-type WUS, that is, in on duration of three consecutive DRX cycles that correspond after the first-type WUS is received. If the first-type WUS is detected on a monitoring occasion 801, DRX cycles 802, 803, and 804 are three consecutive DRX cycles corresponding to the first-type WUS, that is, the terminal device performs PDCCH monitoring in on duration of the DRX cycles 802, 803, and 804.

When the terminal device receives the first-type WUS in a sleep state and receives the first-type WUS in non-on-duration of a first DRX cycle (where in correspondence to FIG. 8, a DRX cycle 805 is the first DRX cycle). N consecutive DRX cycles after the first DRX cycle are N consecutive DRX cycles corresponding to the first-type WUS. The DRX cycle in the N consecutive DRX cycles is a next DRX cycle of the first DRX cycle (where in correspondence to FIG. 8, the $1^{st}$ DRX cycle is the DRX cycle 802).

When the terminal device receives the first-type WUS in a sleep state and receives the first-type WUS in on duration of a first DRX cycle, N consecutive DRX cycles that include the first DRX cycle are N consecutive DRX cycles corresponding to the first-type WUS.

When the terminal device receives the first-type WUS in an active state and receives the first-type WUS in a first DRX cycle corresponds to the first-type WUS, N consecutive DRX cycles after the first DRX cycle are N consecutive DRX cycles corresponding to the first-type WUS. The $1^{st}$ DRX cycle in the N consecutive DRX cycles is a next DRX cycle of the first DRX cycle.

Further, in one manner, if the first-type WUS carries first information and the first information is any one of the following information: GTS duration, GTS pattern information, activation information of a search space set corresponding to PDCCH monitoring, transmit antenna information, receive antenna information, or DRX configuration effectivity information, the first information remains unchanged before the terminal device receives a next first-type WUS. To be specific, before receiving the next first-type WUS, the terminal device performs data transmission or PDCCH monitoring based on the first information included in the current first-type WUS.

If the first-type WUS carries second information, and the second information is any one of the following information: a first slot offset, a second slot offset, uplink BWP switching information, downlink BWP switching information, or CC wake-up information, when the terminal device is in the active state and receives, before receiving the next first-type WUS, DCI including the second information or a medium access control (layer) control element (Medium Access Control (layer) Control Element, MAC CE for short) message including the second information, the terminal device performs data transmission based on the second information in the DCI or the MAC CE message before receiving the next first-type WUS. In other words, the second information may be updated by the DCI message or the MAC CE message.

In this embodiment, both a value of the first slot offset and a value of the second slot offset are in direct proportion to an energy consumption reduction that the terminal can achieve and in inverse proportion to a data transmission rate. Therefore, in this solution, the first slot offset and/or the second slot offset are/is carried in the first-type WUS. In addition, the first slot offset and/or the second slot offset that are/is carried in the first-type WUS are/is slot offsets and/or a slot offset that are/is determined by the network device based on a current data transmission rate requirement and that enable/enables the terminal device to have optimal energy consumption reduction performance at a current data transmission rate. Therefore, after waking up based on the first-type WUS, the terminal device can immediately obtain a slot offset that enables, under the current data transmission rate requirement, the terminal device to have optimal energy consumption reduction performance, thereby reducing energy consumption of the terminal device.

Figure 9:
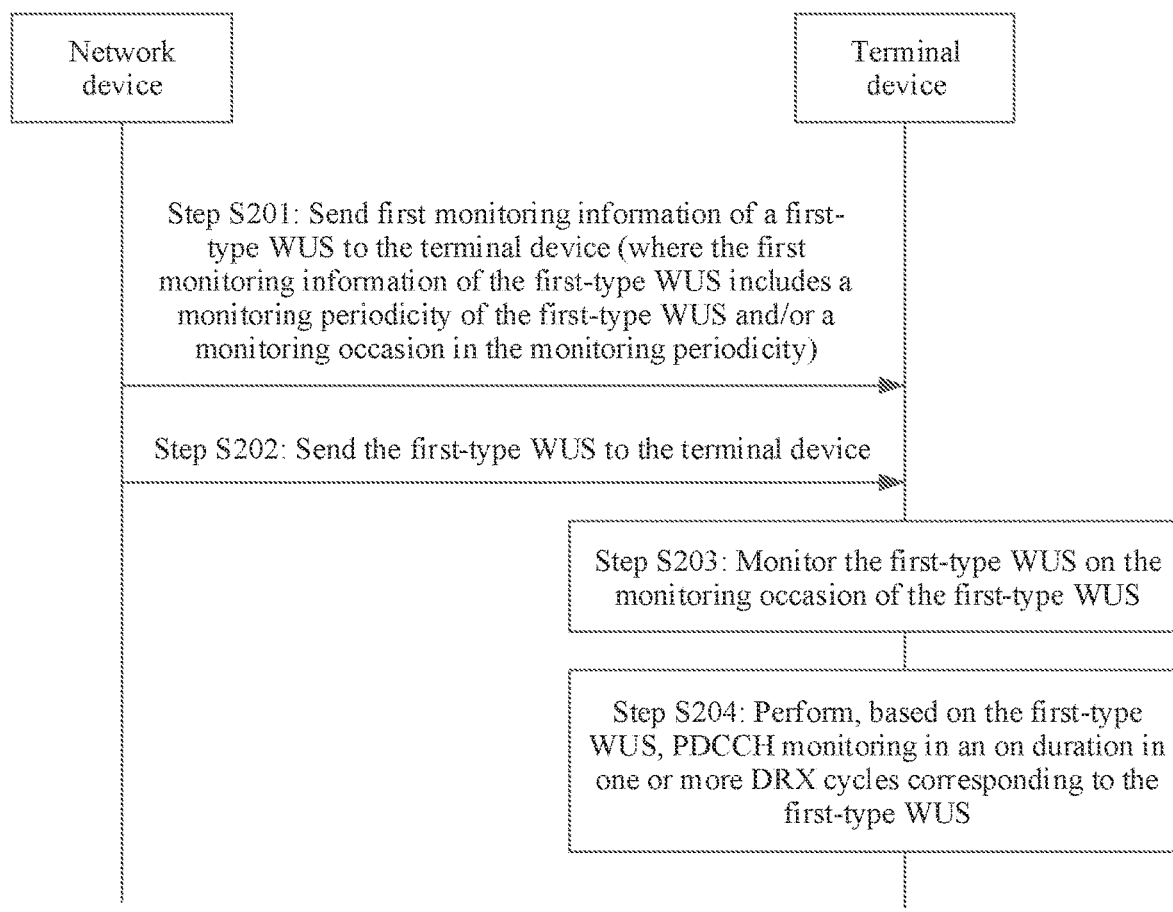
FIG. 9 is a signaling interworking diagram 2 according to an embodiment of this application.
Figure 12:
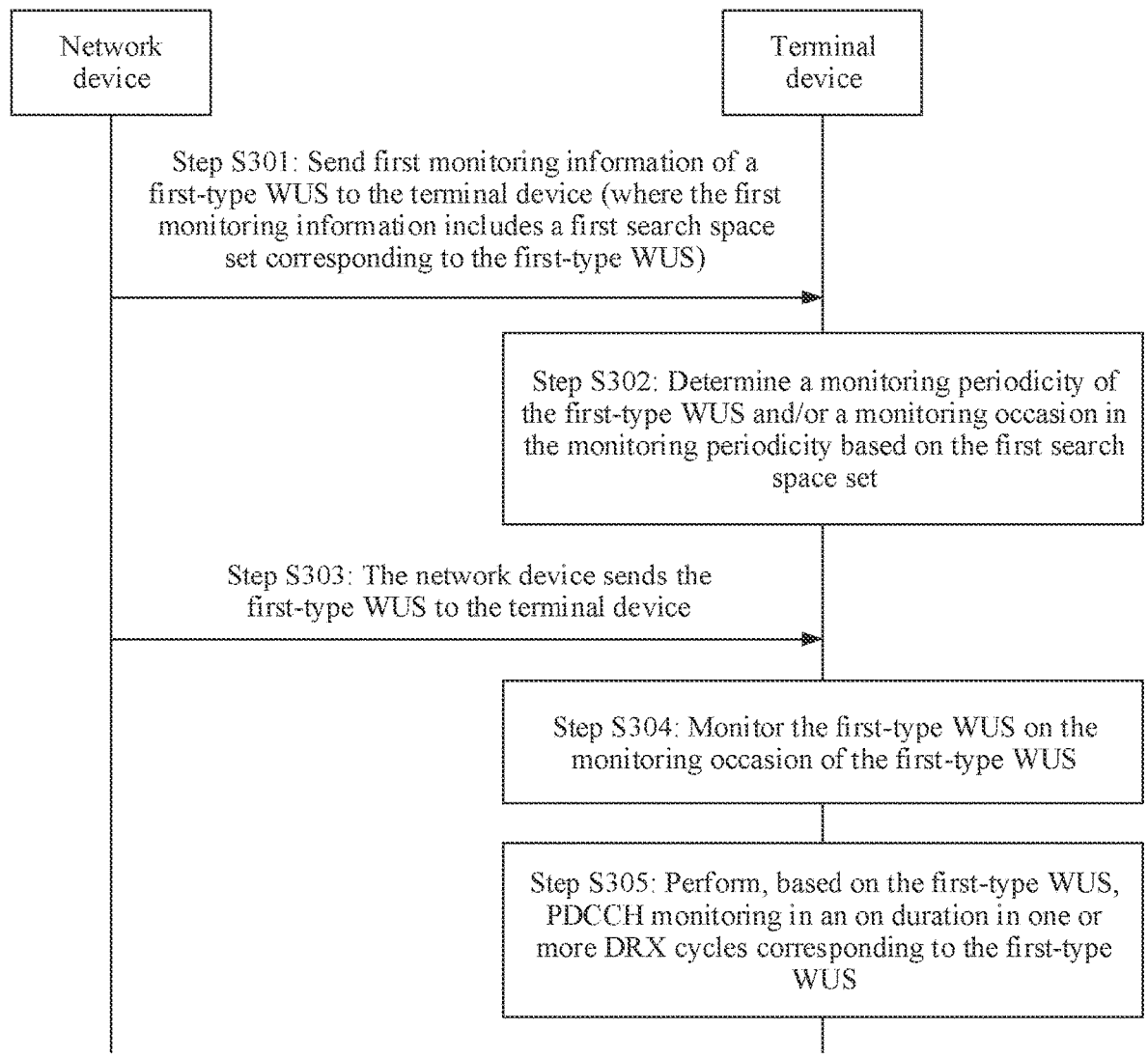
FIG. 12 is a signaling interworking diagram 3 according to an embodiment of this application.

The following uses embodiments shown in FIG. 9 and FIG. 12 to describe in detail the communication method in the foregoing embodiment.

FIG. 9 is a signaling interworking diagram 2 according to an embodiment of this application. Referring to FIG. 9, a method in this embodiment includes the following steps.

Step S201: A network device sends first monitoring information of a first-type WUS to a terminal device, where the first monitoring information of the first-type WUS includes a monitoring periodicity of the first-type WUS and/or a monitoring occasion in the monitoring periodicity.

Specifically, the network device may send the first monitoring information of the first-type WUS to the terminal device through an RRC message.

When the first monitoring information of the first-type WUS includes the monitoring periodicity of the first-type WUS, and does not include the monitoring occasion in the monitoring periodicity, the monitoring occasion in the monitoring periodicity may be agreed on in a protocol. When the first monitoring information of the first-type WUS does not include the monitoring periodicity of the first-type WUS, and includes the monitoring occasion in the monitoring periodicity, the monitoring periodicity of the first-type WUS may be agreed on in a protocol.

For example, the monitoring occasion in the monitoring periodicity is an $m^{th}$ symbol to an $(m+2)^{th}$ symbol in an $n^{th}$ slot and an $m^{th}$ symbol to an $(m+2)^{th}$ symbol in an $(n+1)^{th}$ slot, and both n and m are integers greater than or equal to 1. In addition, n is less than a total quantity of slots included in the monitoring periodicity, and m is less than a total quantity of symbols included in one slot.

Step S202: The network device sends the first-type WUS to the terminal device.

Specifically, the network device sends the first-type WUS to the terminal device on at least some first-type WUS monitoring occasions corresponding to the first monitoring information of the first-type WUS. In other words, on any one of first-type WUS monitoring occasions corresponding to the first monitoring information of the first-type WUS, the network device may send the first-type WUS, or may not send the first-type WUS.

Further, in addition to the information described in step S101 in the embodiment shown in FIG. 7, the first-type WUS may further include second monitoring information of the first-type WUS. The second monitoring information is used to indicate, to the terminal device, a monitoring periodicity of a subsequent first-type WUS and/or a monitoring occasion in the monitoring periodicity; or the second monitoring information is used to indicate the terminal device to skip monitoring the first-type WUS in one or more subsequent monitoring periodicities of the first-type WUS.

The first-type WUS carries new monitoring information used for first-type WUS monitoring, and the new monitoring information used for first-type WUS monitoring may no longer be sent through an RRC message, so that efficiency of obtaining, by the terminal device, the new monitoring information used for first-type WUS monitoring is improved, and resource overheads can also be reduced to some extent Step S203: Monitor the first-type WUS on the monitoring occasion of the first-type WUS.

Specifically, if the first-type WUS does not include the second monitoring information of the first-type WUS, both before and after receiving the first-type WUS, the terminal device monitors the first-type WUS on the monitoring occasion of the first-type WUS corresponding to the first monitoring information of the first-type WUS.

If the first-type WUS includes the second monitoring information of the first-type WUS, before receiving the first-type WUS, the terminal device monitors the first-type WUS on the monitoring occasion of the first-type WUS corresponding to the first monitoring information of the first-type WUS; and after receiving the first-type WUS, the terminal device monitors the first-type WUS on a monitoring occasion of the first-type WUS corresponding to the second monitoring information of the first-type WUS.

Specifically, when the first-type WUS includes the second monitoring information of the first-type WUS and the second monitoring information indicates, to the terminal device, the subsequent monitoring periodicity of the first-type WUS, that is, the first-type WUS carries a new monitoring periodicity of the first-type WUS, after receiving the first-type WUS, the terminal device monitors the first-type WUS in the new monitoring periodicity and on a monitoring occasion of the first-type WUS corresponding to the monitoring occasion (the monitoring occasion in the monitoring periodicity included in the first monitoring information of the first-type WUS) in the monitoring periodicity.

When the first-type WUS includes the second monitoring information of the first-type WUS and the second monitoring information indicates, to the terminal device, a monitoring occasion, in the subsequent monitoring periodicity, of the first-type WUS, that is, the first-type WUS carries a new monitoring occasion, in the monitoring periodicity, of the first-type WUS, after receiving the first-type WUS, the terminal device monitors the first-type WUS in the monitoring periodicity (the monitoring periodicity included in the first monitoring information of the first-type WUS) and on a monitoring occasion of the first-type WUS corresponding to the new monitoring occasion in the monitoring periodicity.

When the first-type WUS includes the second monitoring information of the first-type WUS and the second monitoring information indicates, to the terminal device, the subsequent monitoring periodicity of the first-type WUS and/or the monitoring occasion in the monitoring periodicity, that is, the first-type WUS carries a new monitoring periodicity of the first-type WUS and a new monitoring occasion in the monitoring periodicity, after receiving the first-type WUS, the terminal device monitors the first-type ANUS in the new monitoring periodicity and on a monitoring occasion of the first-type WUS corresponding to the new monitoring occasion in the monitoring periodicity.

When the first-type WUS includes the second monitoring information of the first-type WUS and the second monitoring information indicates the terminal device to skip monitoring the first-type WUS in one or more subsequent monitoring periodicities of the first-type WUS, after completing monitoring in one or more DRX cycles corresponding to the first-type WUS, the terminal device skips one or more monitoring periodicities of the first-type WUS, and then monitors the first-type WUS on a monitoring occasion in a monitoring periodicity corresponding to the first monitoring information of the first-type WUS. After the monitoring is completed, the terminal device skips one or more monitoring periodicities of the first-type WUS again, and so on, until the monitoring periodicity of the first-type WUS and/or the monitoring occasion in the monitoring periodicity are/is updated again. The skipping one or more monitoring periodicities of the first-type WUS herein means that the first-type WUS monitoring is not performed on a monitoring occasion in the skipped one or more monitoring periodicities of the first-type WUS.

Figure 10:
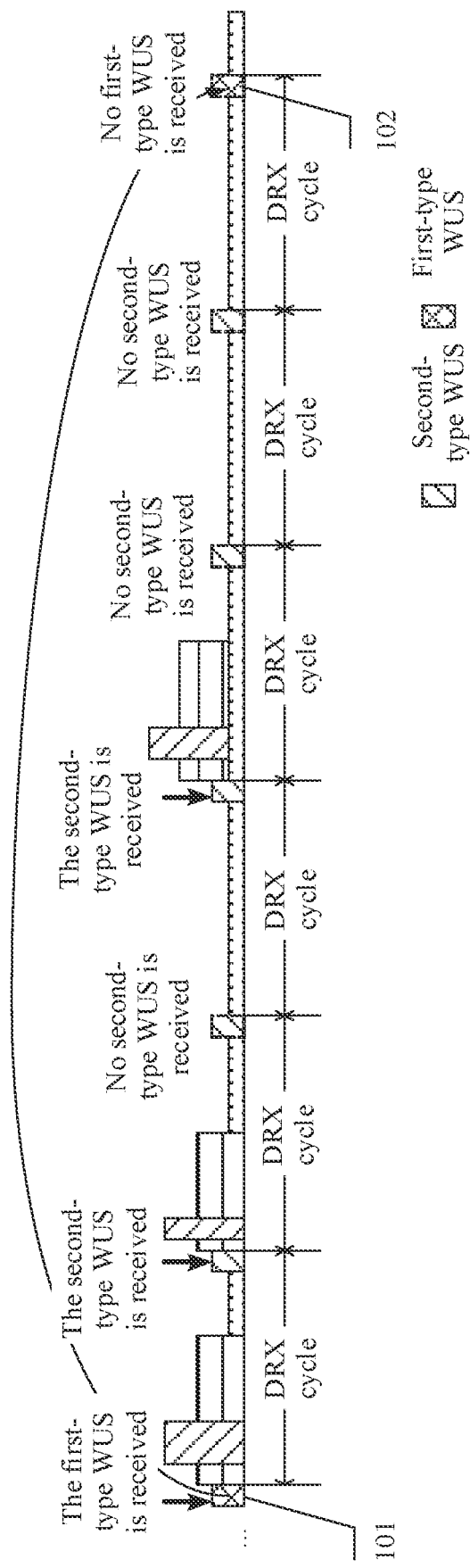
FIG. 10 is a schematic diagram of updating a monitoring occasion of a first-type WUS according to an embodiment of this application.

FIG. 10 is a schematic diagram of updating a monitoring occasion of a first-type WUS according to an embodiment of this application. Before the first-type WUS is received, a monitoring periodicity of the first-type WUS is three DRX cycles, and second monitoring information included in the first-type WUS indicates, to the terminal device, that a monitoring periodicity of a subsequent first-type WUS is six DRX cycles. After the first-type WUS is received, the monitoring periodicity of the first-type WUS is six DRX cycles. As shown in FIG. 10, 101 is a monitoring occasion of the first-type WUS, 102 is another monitoring occasion of the first-type WUS, and there is an interval of six DRX cycles between the two monitoring occasions.

Further, when a monitoring occasion of the first-type WUS corresponds to an active state of the terminal device, first-type WUS monitoring may be performed on the monitoring occasion of the first-type WUS; and when a monitoring occasion of the first-type WUS corresponds to a sleep state of the terminal device, first-type WUS monitoring may be performed on the monitoring occasion of the first-type WUS, In other words, when the terminal device is in the active state, the first-type WUS monitoring may not be skipped; and when the terminal device is in the sleep state, the first-type WUS monitoring may also not be skipped, That a monitoring occasion of the first-type WUS corresponds to an active state or a sleep state of the terminal device means that the terminal device is in the active state or the sleep state on the monitoring occasion of the first-type WUS.

Still further, if the terminal device is configured with a long DRX cycle and a short DRX cycle, when a monitoring occasion of the first-type WUS corresponds to the long DRX cycle, first-type WUS monitoring may be performed on the monitoring occasion of the first-type WUS; and when a monitoring occasion of the first-type WUS corresponds to the short DRX cycle, first-type WUS monitoring may not be performed on the monitoring occasion of the first-type WUS. In other words, the first-type WUS monitoring is skipped in the short DRX cycle. That a monitoring occasion of the first-type WUS corresponds to the long DRX cycle means that a DRX cycle in which the monitoring occasion of the first-type WUS is located is the long DRX cycle. That a monitoring occasion of the first-type WUS corresponds to the short DRX cycle means that a DRX cycle in which the monitoring occasion of the first-type WUS is located is the short DRX cycle.

Skipping the first-type WUS monitoring in the short DRX cycle can reduce a frequency of updating transmission energy consumption information, and can also reduce a quantity of times of sending the first-type WUS, thereby reducing impact on a data transmission process and reducing resource overheads.

In conclusion, the first-type WUS monitoring may be skipped in the following case: When the monitoring occasion of the first-type WUS corresponds to the short DRX cycle, the first-type WUS monitoring is skipped.

Figure 11:
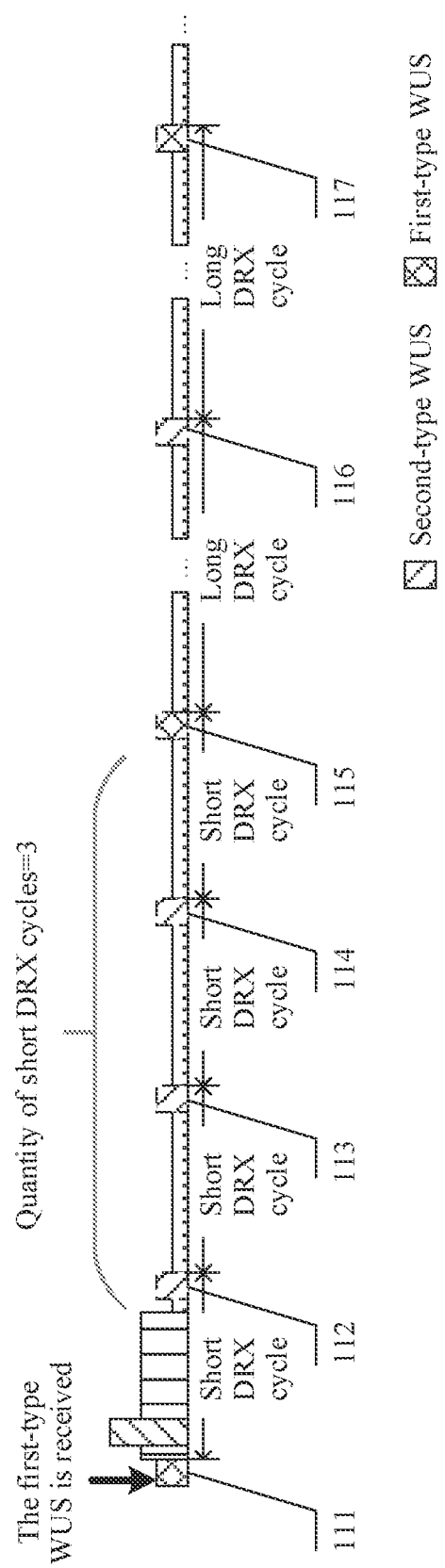
FIG. 11 is a schematic diagram of skipping monitoring a first-type WUS in a short DRY cycle according to an embodiment of this application.

FIG. 11 is a schematic diagram of skipping first-type WUS monitoring in a short DRX cycle according to an embodiment of this application. Referring to FIG. 11, 111 is a monitoring occasion of the first-type WUS, and the first-type WUS is detected or received on 111. 112 is a monitoring occasion of a second-type WUS, and no second-type WUS is detected on 112. 113 is a monitoring occasion of the first-type WUS and is also a monitoring occasion of the second-type WUS. However, because 113 corresponds to the short DRX cycle, first-type WUS monitoring is skipped. 114 is a monitoring occasion of the second-type WUS, and no second-type WUS is detected on 114. 115 is a monitoring occasion of the first-type WUS, and no first-type WUS is detected on 115. 116 is a monitoring occasion of the second-type WUS, and no second-type WUS is detected on 116. 117 is a monitoring occasion of the first-type WUS, and no first-type WUS is detected on 117. For the second-type WUS shown in FIG. 11, refer to descriptions in subsequent embodiments.

Step S204: The terminal device performs, based on the first-type WUS, PDCCH monitoring in on duration of one or more discontinuous reception DRX cycles corresponding to the first-type WUS.

Specifically, if the first-type WUS is detected on a monitoring occasion of the first-type WUS, the terminal device wakes up in the on duration of the one or more discontinuous reception DRX cycles corresponding to the first-type WUS, to perform PDCCH monitoring.

When a monitoring occasion of the first-type WUS corresponds to the sleep state of the terminal device, and the first-type WUS is detected on the monitoring occasion of the first-type WUS, the terminal device wakes up in the on duration of the one or more DRX cycles corresponding to the first-type WUS, to perform PDCCH monitoring. Further, after waking up in the on duration of the one or more DRX cycles corresponding to the first-type WUS, the terminal device performs data transmission and/or PDCCH monitoring based on transmission energy consumption information included in the first-type WUS.

When a monitoring occasion of the first-type WUS corresponds to the active state of the terminal device, and the first-type WUS is detected on the monitoring occasion of the first-type WUS, the terminal device continues to maintain the current active state, and performs data transmission and/or PDCCH monitoring based on the transmission energy consumption information included in the first-type WUS.

It may be understood that, when a monitoring occasion of the first-type WUS corresponds to the sleep state of the terminal device, and no first-type WUS is detected on the monitoring occasion of the first-type WUS, the terminal device continues to sleep.

When a monitoring occasion of the first-type WUS corresponds to the active state of the terminal device, and no first-type WUS is detected on the monitoring occasion of the first-type WUS, the terminal device continues to maintain the current active state, and continues to maintain a current data transmission manner and/or a PDCCH monitoring manner.

In this embodiment, the first monitoring information of the first-type WUS includes the monitoring periodicity and/or the monitoring occasion in the monitoring periodicity, and the terminal device can quickly learn of the monitoring occasion of the first-type WUS. In addition, after waking up based on the first-type WUS, the terminal device can immediately obtain a slot offset that enables, under a current data transmission rate requirement, the terminal device to have optimal energy consumption reduction performance, thereby reducing energy consumption of the terminal device.

FIG. 12 is a signaling interworking diagram 3 according to an embodiment of this application. First monitoring information of a first-type WUS in this embodiment is different from that in the embodiment shown in FIG. 9. For details, refer to FIG. 12. The method in this embodiment includes the following steps.

Step S301: A network device sends the first monitoring information of the first-type WUS to a terminal device, where the first monitoring information includes a first search space set corresponding to the first-type WUS.

Specifically, the first search space set may include the following parameters: a monitoring periodicity, duration (duration), or an intra-slot monitoring start symbol (monitoringSymbolsWithinSlot).

In addition, the first search space set is further associated with a first control resource set, and the first control resource set includes a length of a monitoring symbol.

Step S302: The terminal device determines a monitoring periodicity of the first-type WUS and/or a monitoring occasion in the monitoring periodicity based on the first search space set.

Specifically, the terminal device determines that the monitoring periodicity that is included in the first search space set and that is indicated by the first search space set is the monitoring periodicity of the first-type WUS. The terminal device determines a monitoring occasion, in the monitoring periodicity, of the first-type WUS based on the intra-slot monitoring start symbol included in the first search space set and the length of the monitoring symbol included in the first control resource set associated with the first search space set.

For example, the monitoring periodicity included in the first search space set is 10 ms, the included intra-slot monitoring start symbol is the $1^{st}$ symbol, and the length of the monitoring symbol included in the first control resource set associated with the first search space set is 3. In this case, the terminal device determines that the monitoring periodicity of the first-type WUS is 10 ms, and the monitoring occasion, in the monitoring periodicity, of the first-type WUS is the $1^{st}$ symbol to the $3^{rd}$ symbol in an $n^{th}$ slot, where the $n^{th}$ slot is separately indicated by the network device.

It may be understood that, in this case, the first-type WUS is downlink control information (downlink control information, DCI for short), and a DCI format corresponding to the first-type WUS may be agreed on in a protocol.

Step S303: The network device sends the first-type WUS to the terminal device.

Specifically, for specific implementation of this step, refer to descriptions in step S202 in the embodiment shown in FIG. 9. Details are not described herein again.

In addition, the network device further sends, to the terminal device, a first radio network temporary identifier (radio network temporary identifier, RNTI for short) used to scramble a cyclic redundancy check (Cyclic Redundancy Check, CRC) bit of the DCI corresponding to the first-type WUS, Step S304: The terminal device monitors the first-type WUS on the monitoring occasion of the first-type WUS, Specifically, a difference of this step from step S203 in the embodiment shown in FIG. 9 lies in that: When a monitoring occasion of the first-type WUS corresponds to a sleep state of the terminal, the first-type WUS may be monitored on the monitoring occasion of the first-type WUS; and when a monitoring occasion of the first-type WUS corresponds to an active state of the terminal, the first-type WUS is not monitored on the monitoring occasion of the first-type WUS.

Further, when a monitoring occasion of the first-type WUS corresponds to the sleep state of the terminal device, the terminal device monitors the first-type WUS on the monitoring occasion of the first-type WUS by using the DCI format corresponding to the first-type WUS and the first RNTI used to scramble the first-type WUS.

For remaining specific implementation of this step, refer to descriptions in step S203 in the embodiment shown in FIG. 9. Details are not described herein again.

Step S305: The terminal device performs, based on the first-type WUS, PDCCH monitoring in on duration of one or more DRX cycles corresponding to the first-type WUS.

Specifically, if the first-type WUS is detected on a monitoring occasion of the first-type WUS, the terminal device wakes up in the on duration of the one or more discontinuous reception DRX cycles corresponding to the first-type WUS, to perform PDCCH monitoring.

Further, when the terminal device is in the active state, one or more RNTIs used by the terminal device to perform PDCCH monitoring do not include the first RNTI corresponding to the first-type WUS. That is, when the terminal is in the active state, the terminal does not monitor the first-type WUS.

For specific implementation of this step, refer to descriptions in step S204 in the embodiment shown in FIG. 9. Details are not described herein again.

In this embodiment, the first monitoring information of the first-type WUS includes the first search space set, and the first-type WUS is used as DCI, thereby reducing complexity of sending the first-type WUS by the network device. In addition, after waking up based on the first-type WUS, the terminal device can immediately obtain a slot offset that enables, under the current data transmission rate requirement, the terminal device to have optimal energy consumption reduction performance, thereby reducing energy consumption of the terminal device.

Figure 13:
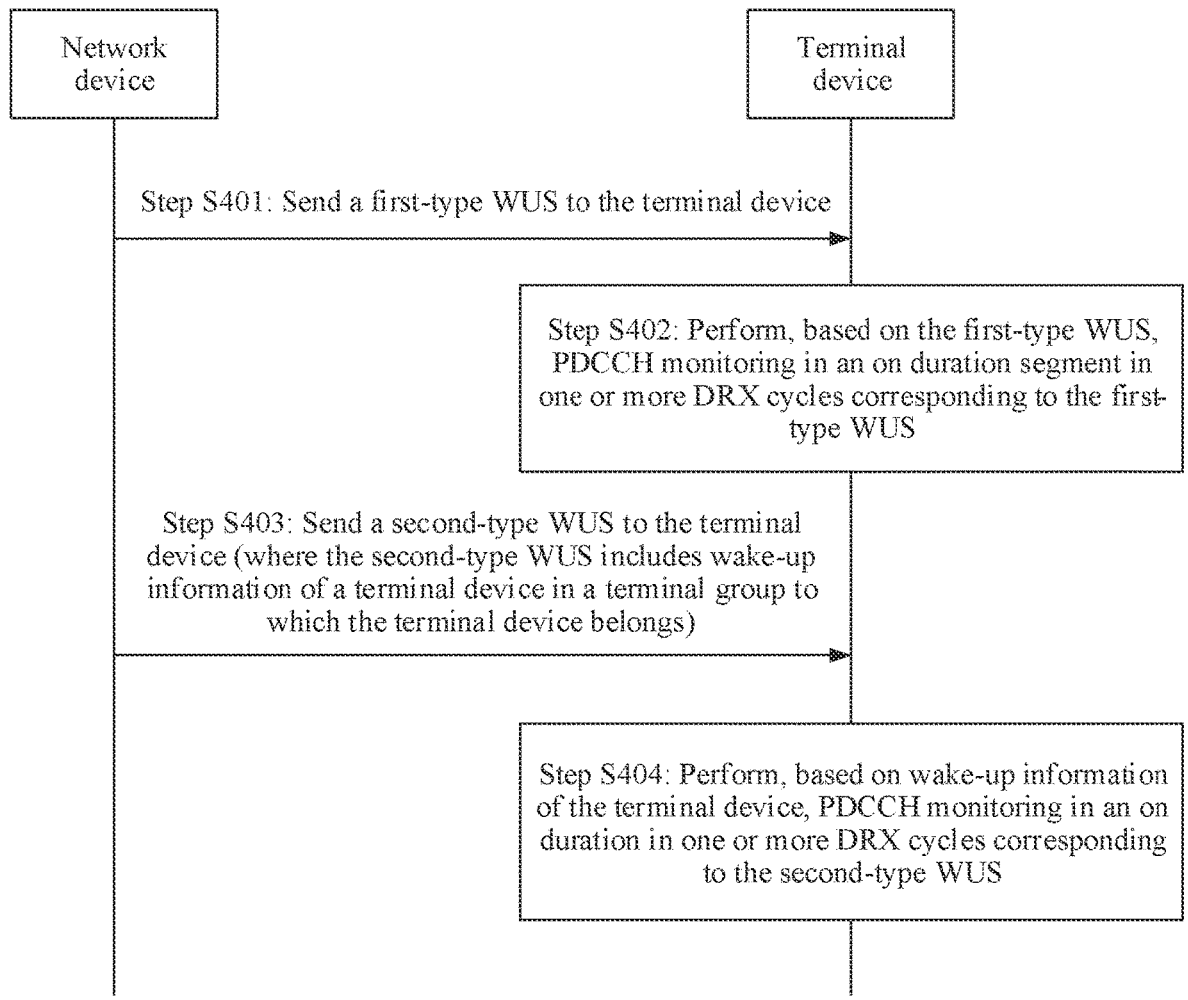
FIG. 13 is a signaling interworking, diagram 4 of a communication method according to an embodiment of this application.

It can be learned from the foregoing embodiment that, because the first-type WUS carries transmission energy consumption information, resource overheads are relatively high when the network device sends the first-type WUS. To reduce the resource overheads, this embodiment of this application makes a further improvement based on the foregoing embodiment. FIG. 13 is a signaling interworking diagram 4 of a communication method according to an embodiment of this application. Referring to FIG. 13, the method in this embodiment includes the following steps.

Step S401: network device sends a first-type WUS to a terminal device.

Specifically, for specific implementation of this step, refer to descriptions in step S101 in the embodiment shown in FIG. 7. Details are not described herein again.

Step S402: The terminal device performs, based on the first-type WUS, PDCCH monitoring in on duration of one or more DRX cycles corresponding to the first-type WUS.

Specifically, for specific implementation of this step, refer to descriptions in step S102 in the embodiment shown in FIG. 7. Details are not described herein again.

Step S403: The network device sends a second-type WUS to the terminal device, where the second-type WUS includes wake-up information of a terminal device in a terminal group to which the terminal device belongs.

Specifically, the second-type WUS includes the wake-up information of the terminal device in the terminal group to which the terminal device belongs, and does not include the transmission energy consumption information included in the first-type WUS in step S101 in the embodiment shown in FIG. 7. Therefore, resource overheads of the second-type WUS are relatively small. The terminal group to which the terminal device belongs includes one or more terminal devices, and the terminal group to which the terminal device belongs includes the terminal device.

For example, the second-type WUS includes 11100, and each bit is wake-up information of a terminal device in a terminal group to which the terminal device belongs, "1" indicates that the terminal device wakes up to perform PDCCH monitoring, and "0" indicates that the terminal device does not wake up to perform PDCCH monitoring. If the $1^{st}$ bit "1" in "11100" is wake-up information of the terminal device, the terminal needs to wake up to perform PDCCH monitoring.

It may be understood that a time domain resource used by the network device to send the first-type WUS is different from a time domain resource used by the network device to send the second-type WUS.

Step S404: The terminal device performs, based on wake-up information of the terminal device, PDCCH monitoring in on duration of one or more DRX cycles corresponding to the second-type WUS.

Specifically, when the wake-up information of the terminal device indicates that the terminal device needs to wake up, the terminal device wakes up in the one or more DRX cycles corresponding to the second-type WUS to perform PDCCH monitoring.

The following describes the one or more DRX cycles corresponding to the second-type WUS.

It may be understood that the terminal device may perform periodic monitoring on the second-type WUS. In one manner, a monitoring periodicity of the second-type WUS is M times the DRX cycle, and the one or more DRX cycles corresponding to the second-type WUS are M consecutive DRX cycles, that is, the second-type WUS corresponds to M consecutive DRX cycles. It may be understood that when M=1, the second-type WUS corresponds to one DRX cycle, and when M is greater than 1, the second-type WUS corresponds to a plurality of DRX cycles. When the second-type WUS corresponds to the plurality of DRX cycles, a quantity of times that the network device sends the second-type WUS may be reduced, thereby reducing resource overheads.

When the terminal device receives the second-type WUS in a sleep state and receives a first WUS in non-on-duration of a second DRX cycle, M consecutive DRX cycles after the second DRX cycle are M consecutive DRX cycles corresponding to the second-type WUS. The DRX cycle in the M consecutive DRX cycles is a next DRX cycle of the second DRX cycle.

When the terminal device receives the second-type WUS in a sleep state and receives a first WUS in on duration of a second DRX cycle, M consecutive DRX cycles that include the second DRX cycle are M consecutive DRX cycles corresponding to the second-type WUS.

Figure 14:
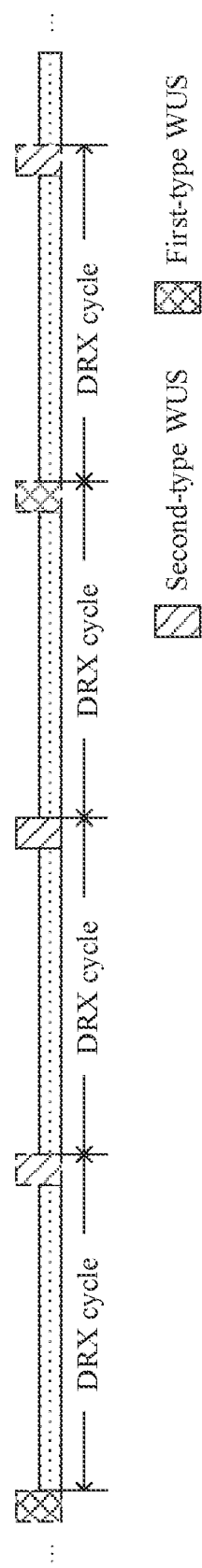
FIG. 14 is a schematic diagram of a combination of a first-type WUS and a second-type WUS according to an embodiment of this application.

FIG. 14 is a schematic diagram of a combination of a first-type WUS and a second-type WUS according to an embodiment of this application. Referring to FIG. 14, every three DRX cycles, the first-type WUS is sent or received once, and the second-type WUS is sent or received twice.

In this embodiment, in addition to sending the first-type WUS to a terminal device to wake up the terminal device, a network device further sends the second-type WUS to the terminal device to wake up the terminal device. A probability of sending the first-type WUS in this embodiment is lower than a probability of sending only the first-type WUS to the terminal device. Therefore, resource overheads can be reduced.

Figure 15:
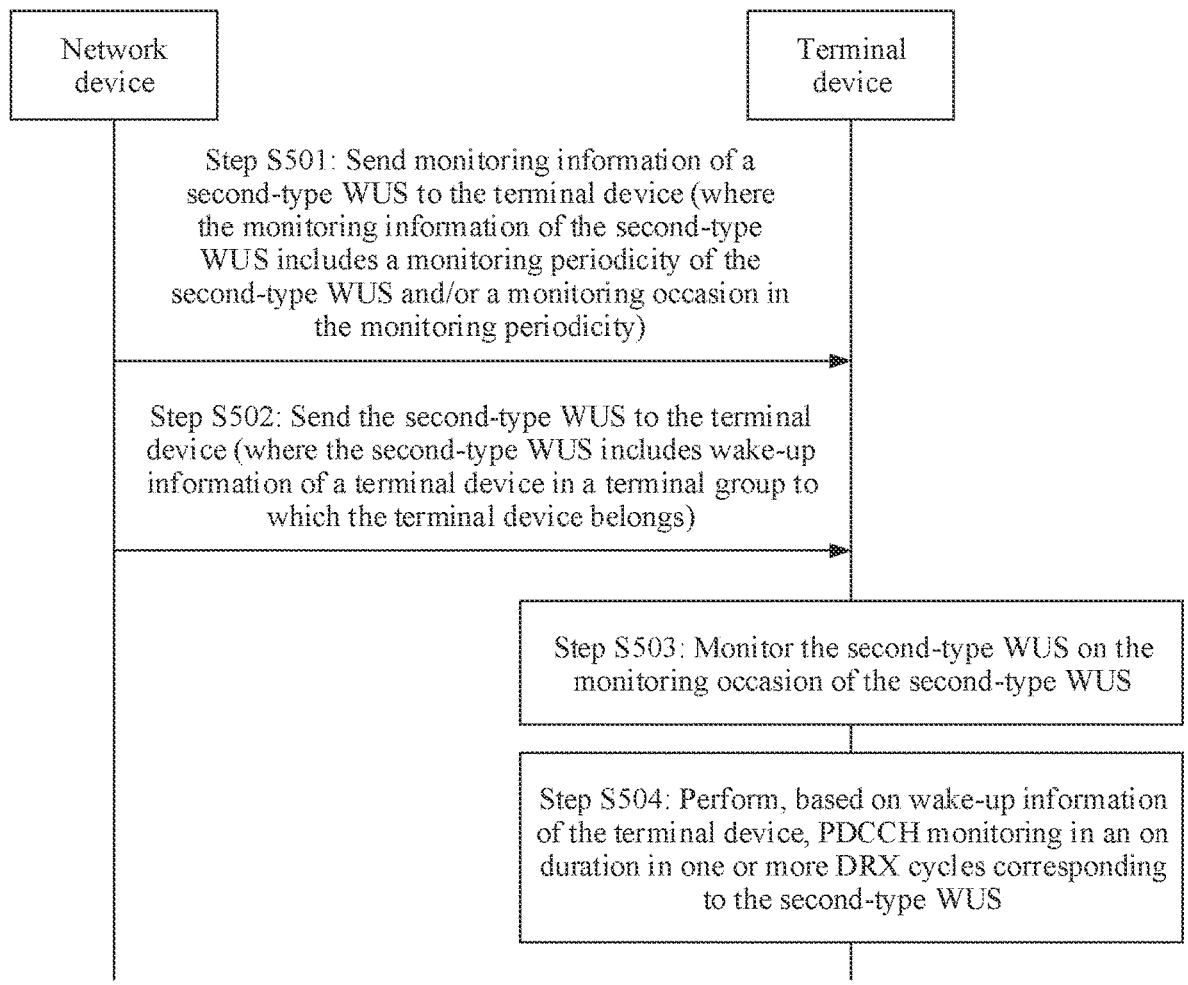
FIG. 15 is a signaling interworking diagram 5 of a communication method according to an embodiment of this application.
Figure 16:
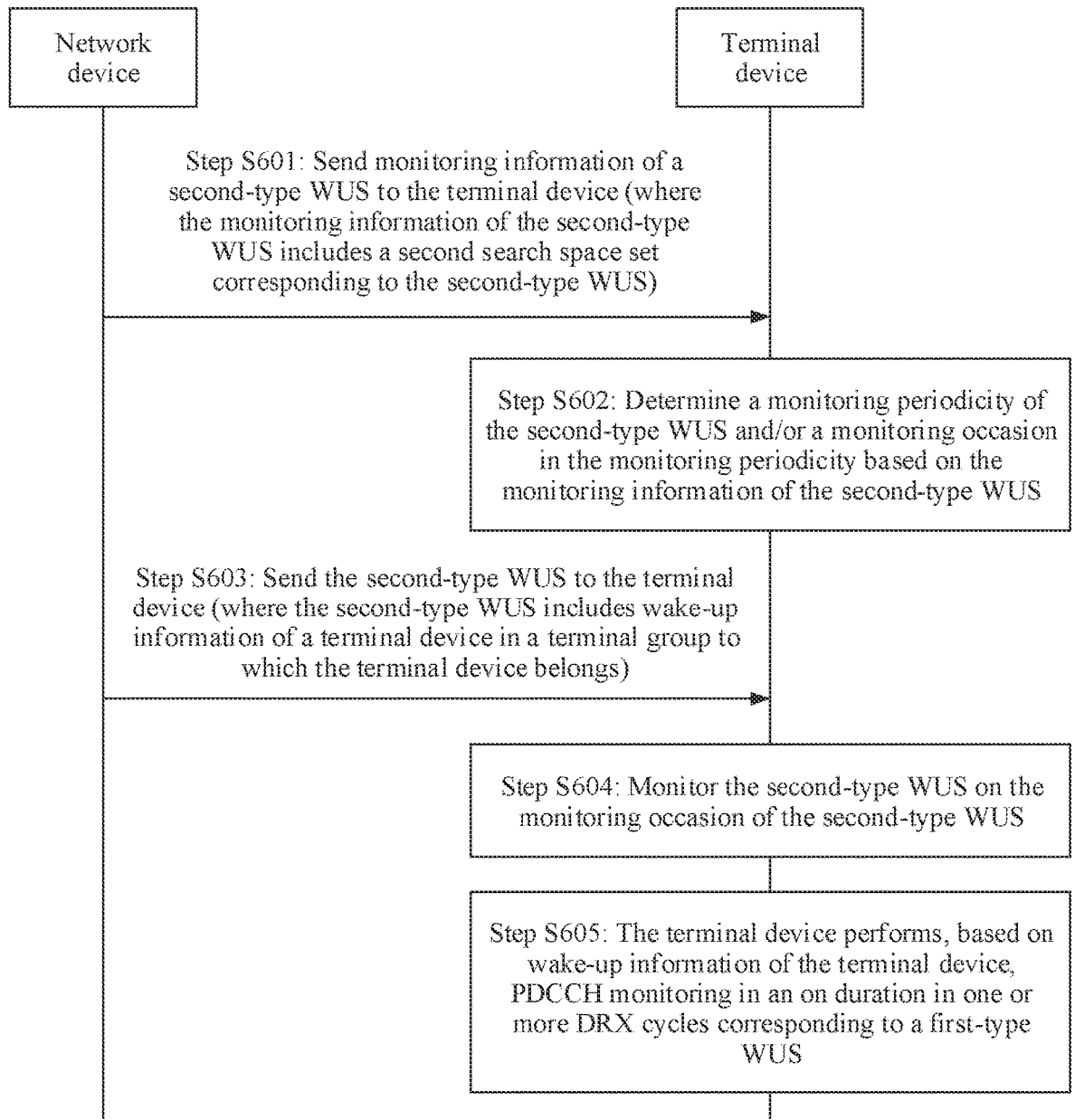
FIG. 16 is a signaling interworking diagram 6 of a communication method according to an embodiment of this application.

The following uses the embodiments shown in FIG. 15 and FIG. 16 to describe in detail receiving and sending of the second-type WUS in the embodiment shown in FIG. 13. FIG. 15 is a signaling interworking diagram 5 of a communication method according to an embodiment of this application. Referring to FIG. 15, the method in this embodiment includes the following steps.

Step S501: A network device sends monitoring information of a second-type WUS to a terminal device, where the monitoring information of the second-type WUS includes a monitoring periodicity of the second-type WUS and/or a monitoring occasion in the monitoring periodicity.

Specifically, the network device may send the monitoring information of the second-type WUS to the terminal device through an RRC message.

When the monitoring information of the second-type WUS includes the monitoring periodicity of the second-type WUS, and does not include the monitoring occasion in the monitoring periodicity, the monitoring occasion in the monitoring periodicity may be agreed on in a protocol. When the monitoring information of the second-type WUS does not include the monitoring periodicity of the second-type WUS, and includes the monitoring occasion in the monitoring periodicity, the monitoring periodicity of the second-type WUS may be agreed on in a protocol.

For example, the monitoring occasion in the monitoring periodicity is an $m^{th}$ symbol to an $(m+2)^{th}$ symbol in an $n^{th}$ slot and an $m^{th}$ symbol to an $(m+2)^{th}$ symbol in an $(n+1)^{th}$ slot, and both n and m are integers greater than or equal to 1. In addition, n is less than a total quantity of slots included in the monitoring periodicity, and m is less than a total quantity of symbols included in one slot.

Further, in one manner, a monitoring periodicity of a first-type WUS is greater than the monitoring periodicity of the second-type WUS. Alternatively, a monitoring occasion set of a first-type WUS in a first time period is a subset of a monitoring occasion set of the second-type WUS in the first time period, where the first time period may be any time period. In this manner, a possibility of sending the first-type WUS can be reduced, impact of frequent updating of transmission energy consumption information on a PDCCH monitoring and/or data transmission process is reduced, and resource overheads can also be reduced.

Step S502: The network device sends the second-type WUS to the terminal device, where the second-type WUS includes wake-up information of a terminal device in a terminal group to which the terminal device belongs.

Specifically, the network device sends the second-type WUS to the terminal device on at least some second-type WUS monitoring occasions corresponding to the monitoring information of the second-type WUS. In other words, on any one of second-type WUS monitoring occasions corresponding to the monitoring information of the second-type WUS, the network device may send the second-type WUS, or may not send the second-type WUS.

For that the second-type WUS includes wake-up information of a terminal device in a terminal group to which the terminal device belongs, refer to the descriptions of step S403 in the embodiment shown in FIG. 13. Details are not described herein again.

Step S503: The terminal device monitors the second-type WUS on the monitoring occasion of the second-type WUS.

Specifically, because the second-type WUS includes the wake-up information but does not include the transmission energy consumption information, to reduce energy consumption of the terminal, when the monitoring occasion of the second-type WUS corresponds to an active state of the terminal device, the second-type WUS may not be monitored on the monitoring occasion of the second-type WUS. That is, when the terminal device is in the active state, monitoring the second-type WUS may be skipped.

When the monitoring occasion of the second-type WUS corresponds to a sleep state of the terminal device, the second-type WUS needs to be monitored on the monitoring occasion of the second-type WUS. That is, when the terminal device is in the sleep state, monitoring the second-type WUS may not be skipped.

Further, if the terminal device is in the sleep state, the terminal device may further skip, under a first condition, monitoring the second-type WUS, The first condition is that the monitoring occasion of the second-type WUS is the same as a monitoring occasion of the first-type WUS. Alternatively, a slot in which the monitoring occasion of the second-type WUS is located is the same as a slot in which a monitoring occasion of the first-type WUS is located. Alternatively, a DRX cycle in which the monitoring occasion of the second-type WUS is located is the same as a DRX cycle in which a monitoring occasion of the first-type WUS is located. In other words, when the monitoring occasion of the second-type WUS is the same as the monitoring occasion of the first-type WUS; or the slot in which the monitoring occasion of the second-type WUS is located is the same as the slot in which the monitoring occasion of the first-type WUS is located; or the DRX cycle in which the monitoring occasion of the second-type WUS is located is the same as the DRX cycle in which the monitoring occasion of the first-type WUS is located, the terminal device monitors the first-type WUS on the monitoring occasion of the first-type WUS, and does not monitor the second-type WUS on the monitoring occasion of the second-type WUS. In this manner, reception of the first-type WUS can be ensured, and reception of the transmission energy consumption information included in the first-type WUS can also be reduced, to improve power saving performance of the terminal device as much as possible while a data transmission rate requirement is ensured.

Still further, if the terminal device is configured with a long DRX cycle and a short DRX cycle, when the monitoring occasion of the second-type WUS corresponds to the long DRX cycle and the monitoring occasion of the second-type WUS does not satisfy a condition that monitoring needs to be skipped, the second-type WUS may be monitored on the monitoring occasion of the second-type WUS. When the monitoring occasion of the second-type WUS corresponds to the short DRX cycle and the monitoring occasion of the second-type WUS does not satisfy a condition that monitoring needs to be skipped, the second-type WUS may be monitored on the monitoring occasion of the second-type WUS. That is, the long DRX cycle and the short DRX cycle do not affect the second-type WUS monitoring.

In conclusion, a case in which the second-type WUS monitoring may be skipped includes: The second-type WUS monitoring is skipped when the terminal device is in the active state; and the second-type WUS monitoring is skipped when the terminal device is in the sleep state and the first condition is satisfied.

Step S504: The terminal device performs, based on wake-up information of the terminal device, PDCCH monitoring in on duration of one or more DRX cycles corresponding to the second-type WUS.

Specifically, if the terminal device detects the second-type WUS on the monitoring occasion of the second-type WUS, to be specific, if the terminal device receives the second-type WUS, and the wake-up information of the terminal device included in the second-type WUS indicates the terminal to wake up, the terminal device performs PDCCH monitoring in the on duration of the one or more DRX cycles corresponding to the second-type WUS.

If the monitoring occasion of the first-type WUS corresponds to the sleep state of the terminal device, when the second-type WUS is detected on the monitoring occasion of the second-type WUS, and the wake-up information of the terminal device included in the second-type WUS indicates the terminal to wake up to perform PDCCH monitoring, the terminal device wakes up in the on duration of the one or more DRX cycles corresponding to the second-type WUS, to perform PDCCH monitoring; or when the second-type WUS is not detected on the monitoring occasion of the second-type WUS, the terminal device continues to sleep.

In this embodiment, the monitoring information of the second-type WUS includes the monitoring periodicity and/or the monitoring occasion in the monitoring periodicity, and the terminal device can quickly learn of the monitoring occasion of the second-type WUS, and the resource overheads are also reduced.

FIG. 16 is a signaling interworking diagram 6 of a communication method according to an embodiment of this application. Monitoring information of a second-type WUS in this embodiment is different from the monitoring information of the second-type WUS in the embodiment shown in FIG. 15. Referring to FIG. 16, the method in this embodiment includes the following steps.

Step S601: A network device sends the monitoring information of the second-type WUS to a terminal device, where the monitoring information of the second-type WUS includes a second search space set corresponding to the second-type WUS.

Specifically, the second search space set may include the following parameters: a monitoring periodicity, duration (duration), or an intra-slot monitoring start symbol (monitoringSymbolsWithinSlot).

In addition, the second search space set is further associated with a second control resource set, and the control resource set includes a length of a monitoring symbol.

Step S602: The terminal device determines a monitoring periodicity of the second-type WUS and/or a monitoring occasion in the monitoring periodicity based on the monitoring information of the second-type WUS.

Specifically, the terminal device determines that the monitoring periodicity included in the second search space set is the monitoring periodicity of the second-type WUS. The terminal device determines a monitoring occasion, in the monitoring periodicity, of the second-type WUS based on the intra-slot monitoring start symbol included in the second search space set and the length of the monitoring symbol included in the second control resource set associated with the second search space set.

It may be understood that, in this case, the second-type WUS is downlink control information (downlink control information, DCI for short), and a DCI format corresponding to the second-type WUS may be agreed on in a protocol.

Step S603: The network device sends the second-type WUS to the terminal device, where the second-type WUS includes wake-up information of a terminal device in a terminal group to which the terminal device belongs.

Specifically, for specific implementation of this step, refer to descriptions in step S502 in the embodiment shown in FIG. 15. Details are not described herein again.

In addition, the network device further sends, to the terminal device, a second RNTI used to scramble the second-type WUS.

Step S604: The terminal device monitors the second-type WUS on the monitoring occasion of the second-type WUS.

Specifically, in this embodiment, the second-type WUS is a type of DCI information. Therefore, when the monitoring occasion of the second-type WUS corresponds to a sleep state of the terminal device, the terminal device monitors the second-type WUS on the monitoring occasion of the second-type WUS by using the DCI format corresponding to the second-type WUS and the second RNTI used to scramble the second-type WUS.

For remaining specific implementation of step S604, refer to descriptions in step S503 in the embodiment shown in FIG. 15. Details are not described herein again.

Step S605: The terminal device performs, based on wake-up information of the terminal device, PDCCH monitoring in on duration of one or more DRX cycles corresponding to the second-type WUS.

Specifically, if the terminal device detects the second-type WUS on the monitoring occasion of the second-type WUS, to be specific, if the terminal device receives the second-type WUS, and the wake-up information of the terminal device included in the second-type WUS indicates the terminal to wake up, the terminal device performs PDCCH monitoring in on duration of one or more DRX cycles corresponding to the second-type WUS.

Further, when the terminal device is in an active state, one or more RNTIs used by the terminal device to perform PDCCH monitoring do not include the second RNTI corresponding to the second-type WUS.

For remaining specific implementation of this step, refer to descriptions in step S504 in the embodiment shown in FIG. 15. Details are not described herein again.

In this embodiment, the monitoring information of the second-type WUS includes the search space set, and the second-type WUS is used as DCI, so that complexity of sending the second-type WUS by the network device is reduced, and resource overheads are also reduced.

Figure 17:
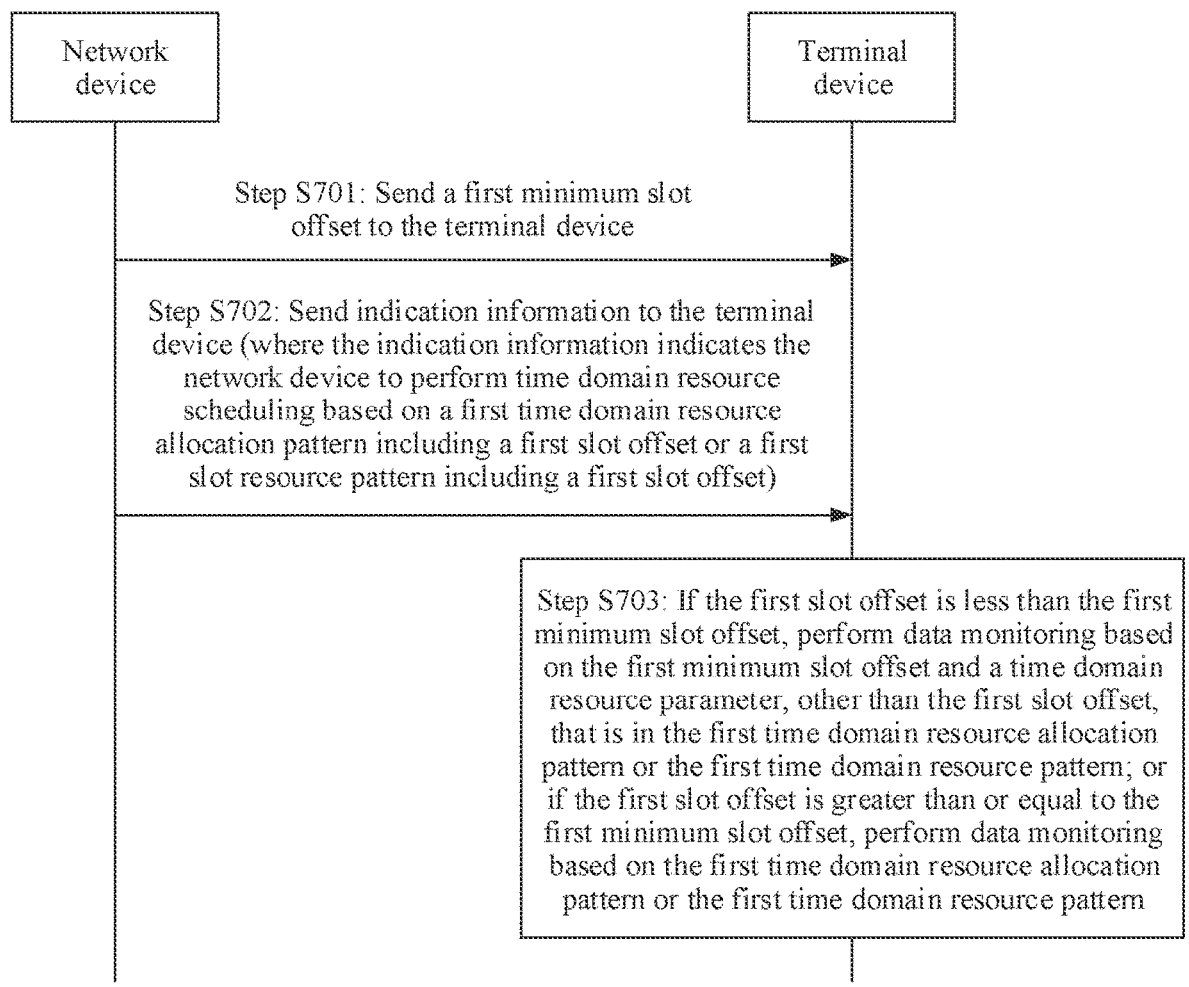
FIG. 17 is a signaling interworking diagram 4 of a communication method according to an embodiment of this application.

Finally, another communication method provided in the embodiments of this application is described by using a specific embodiment. FIG. 17 is a signaling interworking diagram of a communication method according to an embodiment of this application. Referring to FIG. 17, the method in this embodiment includes the following steps.

Step S701: A network device sends a first minimum slot offset to a terminal device. The first minimum slot offset is a minimum slot offset of a PDSCH relative to a PDCCH for scheduling the PDSCH; or the first minimum slot offset is a minimum slot offset of an A-CSI-RS relative to a PDCCH for scheduling the A-CSI-RS; or the first minimum slot offset is a common minimum slot offset of a PDSCH relative to a PDCCH for scheduling the PDSCH and an A-CSI-RS relative to a PDCCH for scheduling the A-CSI-RS; or the first minimum slot offset is a minimum slot offset of a PUSCH relative to a PDCCH for scheduling the PDSCH; or the first minimum slot offset is a common minimum slot offset of a PDSCH relative to a PDCCH for scheduling the PDSCH, an A-CSI-RS relative to a PDCCH for scheduling the A-CSI-RS, and a PUSCH relative to a PDCCH for scheduling the PUSCH.

Specifically, the network device may send, to the terminal device through a first-type WUS or DCI, the first minimum slot offset or information indicating the first minimum slot offset.

There are one or more minimum slot offsets of the PDSCH relative to the PDCCH for scheduling the PDSCH, one or more minimum slot offsets of the A-CSI-RS relative to the PDCCH for scheduling the A-CSI-RS, one or more minimum slot offsets of the PUSCH relative to the PDCCH for scheduling the one or more common minimum slot offsets of the PDSCH relative to the PDCCH for scheduling the PDSCH and the A-CSI-RS relative to the PDCCH for scheduling the A-CSI-RS, and one or more common minimum slot offsets of the PDSCH relative to the PDCCH for scheduling the PDSCH, the A-CSI-RS relative to the PDCCH for scheduling the A-CSI-RS, and the PUSCH relative to the PDCCH for scheduling the PUSCH.

The one or more minimum slot offsets of the PDSCH relative to the PDCCH for scheduling the PDSCH may be configured by the network device for the terminal device by using an RRC message or predefined in a protocol. In step S701, when the first minimum slot offset sent by the network device to the terminal device is the minimum slot offset of the PDSCH relative to the PDCCH for scheduling the PDSCH, the first minimum slot offset is one of the one or more minimum slot offsets of the PDSCH relative to the PDCCH for scheduling the PDSCH.

The one or more minimum slot offsets of the A-CSI-RS relative to the PDCCH for scheduling the A-CSI-RS may be configured by the network device for the terminal device by using an RRC message or predefined in a protocol. In step S701, when the first minimum slot offset sent by the network device to the terminal device is the minimum slot offset of the A-CSI-RS relative to the PDCCH for scheduling the A-CSI-RS, the first minimum slot offset is one of the one or more minimum slot offsets of the A-CSI-RS relative to the PDCCH for scheduling the A-CSI-RS.

The one or more minimum slot offsets of the PUSCH relative to the PDCCH for scheduling the PUSCH may be configured by the network device for the terminal device by using an RRC message or predefined in a protocol. In step S701, when the first minimum slot offset sent by the network device to the terminal device is the minimum slot offset of the PUSCH relative to the PDCCH for scheduling the PUSCH, the first minimum slot offset is one of the one or more minimum slot offsets of the PUSCH relative to the PDCCH for scheduling the PUSCH.

The one or more common minimum slot offsets of the PDSCH relative to the PDCCH for scheduling the PDSCH and the A-CSI-RS relative to the PDCCH for scheduling the A-CSI-RS may be configured by the network device for the terminal device by using an RRC message or predefined in a protocol. In step S701, when the first minimum slot offset sent by the network device to the terminal device is the common minimum slot offset of the PDSCH relative to the PDCCH for scheduling the PDSCH and the A-CSI-RS relative to the PDCCH for scheduling the A-CSI-RS, the first minimum slot offset is one of the one or more common minimum slot offsets of the PDSCH relative to the PDCCH for scheduling the PDSCH and the A-CSI-RS relative to the PDCCH for scheduling the A-CSI-RS.

The one or more common minimum slot offsets of the PDSCH relative to the PDCCH for scheduling the PDSCH, the A-CSI-RS relative to the PDCCH for scheduling the A-CSI-RS, and the PUSCH relative to the PDCCH for scheduling the PUSCH may all be configured by the network device for the terminal device by using an RRC message or predefined in a protocol. In step S701, when the first minimum slot offset sent by the network device to the terminal device is the common minimum slot offset of the PDSCH relative to the PDCCH for scheduling the PDSCH, the A-CSI-RS relative to the PDCCH for scheduling the A-CSI-RS, and the PUSCH relative to the PDCCH for scheduling the PUSCH, the first minimum slot offset is one of the one or more common minimum slot offsets of the PDSCH relative to the PDCCH for scheduling the PDSCH, the A-CSI-RS relative to the PDCCH for scheduling the A-CSI-RS, and the PUSCH relative to the PDCCH for scheduling the PUSCH.

In one manner, the information that indicates the first minimum slot offset and that is sent by the network device to the terminal device may be an index of the first minimum slot offset.

For example, when the first slot offset is the common minimum slot offset of the PDSCH relative to the PDCCH for scheduling the PDSCH and the A-CSI-RS relative to the PDCCH for scheduling the A-CSI-RS, the one or more common minimum slot offsets of the PDSCH relative to the PDCCH for scheduling the PDSCH and the A-CSI-RS relative to the PDCCH for scheduling the A-CSI-RS include 0, 1, 2, and 4. If the network, device determines that the first minimum slot offset corresponding to current data transmission is 1, the network device may send an index of "1", such as "01", namely, two bits, to the terminal device, to indicate the common minimum slot offset of the PDSCH relative to the PDCCH for scheduling the PDSCH and the A-CSI-RS relative to the PDCCH for scheduling the A-CSI-RS.

In another manner, the information that indicates the first minimum slot offset and that is sent by the network device to the terminal device may alternatively be effectivity information, and the effectivity information may include first effectivity information and second effectivity information. The first effectivity information is used to indicate that 0 does not take effect, or the first effectivity information is used to indicate that the first minimum slot offset is and the second effectivity information is used to indicate that the first minimum slot offset is not 0, or the second effectivity information is used to indicate that the minimum slot offset 0 does not take effect currently.

For example, when the first slot offset is the minimum slot offset of the PUSCH relative to the PDCCH for scheduling the PUSCH, the one or more minimum slot offsets of the PUSCH relative to the PDCCH for scheduling the PUSCH include 0 and X, where "X" may be a positive integer (that is, refer to cross-slot scheduling, and X is, for example, 1). The network device may send 1-bit first effectivity information "0" to the terminal device, to indicate that 0 takes effect, or indicate that the first minimum slot offset is 0. In this case, the terminal device determines that the first minimum slot offset is 0. The network device may further send 1-bit second effectivity information "1" to the terminal device, to indicate that 0 does not take effect. In this case, the terminal device determines that X is the first minimum slot offset.

Step S702: The network device sends indication information to the terminal device, where the indication information is used to indicate the network device to perform time domain resource scheduling based on a first time domain resource allocation pattern including the first slot offset or a first time domain resource pattern including the first slot offset.

Specifically, in this embodiment, the PDSCH corresponds to a time domain resource list, and the time domain resource list includes a plurality of slot offsets (K0) of the PDSCH relative to the PDCCH for scheduling the PDSCH. In this embodiment, the plurality of slot offsets are referred to as a plurality of slot offsets corresponding to the PDSCH. The PDSCH time domain resource list may be configured by the network device for the terminal by using an RRC message. For example, a part of the PDSCH time domain resource list may be shown in Table 1.

TABLE 1

| PDSCH time domain resource allocation index | Slot offset K0 | PDSCH mapping type | Start symbol and symbol length indicator value |
|---|---|---|---|
| 0 | 0 | Type A | 91 |
| 1 | 0 | Type B | 53 |
| 2 | 1 | Type A | 66 |
| 3 | 1 | Type A | 66 |
| ... | | | |

When scheduling a time domain resource of the PDSCH, the network device performs time domain resource scheduling for the PDSCH based on each time domain resource allocation pattern (where each row in Table 1 is a time domain resource allocation pattern) in the PDSCH time domain resource list. When the network device performs time domain resource scheduling for the PDSCH based on the first time domain resource allocation pattern including the first slot offset, the network device sends indication information to the terminal device. The indication information indicates the network device to perform time domain resource scheduling for the PDSCH based on the first time domain resource allocation pattern including the first slot offset. The indication information may be an index of the first time domain resource allocation pattern, for example, a PDSCH time domain resource allocation index in any row in the $1^{st}$ column in Table 1.

Further, for a message such as a system message, a paging message, or a random access message (including a conflict resolution identifier of the terminal device or a random access response) sent on the PDSCH, PDSCH scheduling may be performed in a manner of a default PDSCH time domain resource allocation list predefined in a protocol. Specifically, for a PDCCH on which a system message, a paging message, or a random access message is scrambled in a CRC bit of corresponding DCI by using a radio network temporary identifier (Radio Network Temporary Identifier, RNTI for short), a scheduled PDSCH may use a default PDSCH time domain resource allocation list. For example, Table 2 is a part of a default PDSCH time domain resource allocation table. For these cases, when scheduling a PDSCH time domain resource, the network device performs time domain resource scheduling for the PDSCH based on each time domain resource allocation pattern (where each row in Table 2 is a time domain resource allocation pattern) in a default PDSCH time domain resource allocation list. When the network device performs time domain resource scheduling for the PDSCH based on the first time domain resource allocation pattern that is in the default PDSCH time domain resource allocation list and that includes the first slot offset, the network device sends indication information to the terminal device, and the indication information indicates the network device to perform time domain resource scheduling for the PDSCH based on the first time domain resource allocation pattern including the first slot offset.

TABLE 2

| PDSCH time domain resource allocation index | Type-A demodulation reference signal position | PDSCH mapping type | K0 | Start symbol | Symbol length |
|---|---|---|---|---|---|
| 1 | 2 | Type A | 0 | 2 | 12 |
|   | 3 | Type A | 0 | 3 | 11 |
| 2 | 2 | Type A | 0 | 7 | 10 |
|   | 3 | Type A | 0 | 3 | 9 |
| 3 | 2 | Type A | 0 | 2 | 9 |
|   | 3 | Type A | 0 | 3 | 8 |
| ... | | | | | |

Similarly, in this embodiment, the A-CSI-RS corresponds to an aperiodic CSI triggering state list, and the aperiodic CSI triggering state list includes a plurality of slot offsets of the A-CSI-RS relative to the PDCCH for scheduling the A-CSI-RS. In this embodiment, the plurality of slot offsets are referred to as a plurality of slot offsets corresponding to the A-CSI-RS. The aperiodic CSI triggering state list of the A-CSI-RS may be configured by the network device for the terminal by using an RRC message.

When scheduling an A-CSI-RS time domain resource, the network device performs time domain resource scheduling for the A-CSI-RS based on each time domain resource pattern of the CSI-RS in the aperiodic CSI triggering state list of the A-CSI-RS. When the network device performs time domain resource scheduling for the A-CSI-RS based on the first time domain resource pattern including the first slot offset in the aperiodic CSI triggering state list, the network device sends indication information to the terminal device, and the indication information indicates the network device to perform time domain resource scheduling for the A-CSI-RS based on the first time domain resource pattern including the first slot offset.

Specifically, in this embodiment, the PUSCH corresponds to a time domain resource list, and the time domain resource list includes a plurality of slot offsets of the PUSCH relative to the PDCCH for scheduling the PUSCH. In this embodiment, the plurality of slot offsets are referred to as a plurality of slot offsets corresponding to the PUSCH. The PUSCH time domain resource list may be configured by the network device for the terminal by using an RRC message. At least a part of the PUSCH time domain resource list may be shown in Table 3.

TABLE 3

| PUSCH time domain resource allocation list index | Slot offset K2 | PUSCH mapping type | Start symbol and symbol length indicator value |
|---|---|---|---|
| 0 | 1 | Type A | 66 |
| 1 | 2 | Type A | 66 |
| 2 | 1 | Type B | 53 |
| 3 | 2 | Type A | 91 |
| ... | | | |

When scheduling a PUSCH time domain resource, the network device performs time domain resource scheduling for the PUSCH based on each time domain resource allocation pattern (where each row in Table 3 is a time domain resource allocation pattern) in the PUSCH time domain resource list. When the network device performs time domain resource scheduling for the PUSCH based on the first time domain resource allocation pattern including the first slot offset, the network device sends indication information to the terminal device, and the indication information indicates the network device to perform time domain resource scheduling for the PUSCH based on the first time domain resource allocation pattern including the first slot offset.

Step S703: If the first slot offset is less than the first minimum slot offset, the terminal device receives or sends data based on the first minimum slot offset and a time domain resource parameter, other than the first slot offset, that is in the first time domain resource allocation pattern or the first time domain resource pattern; or if the first slot offset is greater than or equal to the first minimum slot offset, the terminal device receives or sends data based on the first time domain resource allocation pattern or the first time domain resource pattern.

Specifically, as described above, for the PDSCH, the network device performs time domain resource scheduling for the PDSCH based on each time domain resource allocation pattern in the PDSCH time domain resource list. When the network device performs time domain resource scheduling for the PDSCH based on the first time domain resource allocation pattern including the first slot offset, there is a case in which the first slot offset is less than the first minimum slot offset. In this case, the terminal device receives or sends data based on the first minimum slot offset and a tune domain resource parameter, other than the first slot offset, that is in the first time domain resource allocation pattern. When the network device schedules the PDSCH based on the first time domain resource allocation pattern including the first slot offset, there is also a case in which the first slot offset is greater than or equal to the first minimum slot offset. In this case, the terminal device receives or sends data based on the first time domain resource allocation pattern. It may be understood that, in this case, the first minimum slot offset is a minimum slot offset of the PDSCH relative to the PDCCH for scheduling the PDSCH, or the first minimum slot offset is a common minimum slot offset of the PDSCH relative to the PDCCH for scheduling the PDSCH and the A-CSI-RS relative to the PDCCH for scheduling the A-CSI-RS, or the first minimum slot offset is a common minimum slot offset of the PDSCH relative to the PDCCH for scheduling the PDSCH, the A-CSI-RS relative to the PDCCH for scheduling the A-CSI-RS, and the PUSCH relative to the PDCCH for scheduling the PUSCH.

Specifically, when the first slot offset is less than the first minimum slot offset, the terminal device determines that the first minimum slot offset is the slot offset of the PDSCH relative to the PDCCH for scheduling the PDSCH. When the first slot offset is greater than or equal to the first minimum slot offset, the terminal device determines that the first slot offset is the slot offset of the PDSCH relative to the PDCCH for scheduling the PDSCH.

As described above, for the A-CSI-RS, the network device performs time domain resource scheduling for the A-CSI-RS based on each time domain resource pattern in the aperiodic CSI triggering state list of the A-CSI-RS. When the network device performs time domain resource scheduling for the A-CSI-RS based on the first time domain resource pattern including the first slot offset, there is a case in which the first slot offset is less than the first minimum slot offset In this case, the terminal device receives or sends data based on the first minimum slot offset and a time domain resource parameter, other than the first slot offset, that is in the first time domain resource pattern. When the network device schedules the A-CSI-RS based on the first time domain resource pattern including the first slot offset, there is also a case in which the first slot offset is greater than or equal to the first minimum slot offset. In this case, the terminal device receives or sends data based on the first time domain resource pattern. It may be understood that, in this case, the first minimum slot offset is a minimum slot offset of the A-CSI-RS relative to the PDCCH for scheduling the A-CSI-RS, or the first minimum slot offset is a common minimum slot offset of the PDSCH relative to the PDCCH for scheduling the PDSCH and the A-CSI-RS relative to the PDCCH for scheduling the A-CSI-RS, or the first minimum slot offset is a common minimum slot offset of the PDSCH relative to the PDCCH for scheduling the PDSCH, the A-CSI-RS relative to the PDCCH for scheduling the A-CSI-RS, and the PUSCH relative to the PDCCH for scheduling the PUSCH.

Specifically, when the first slot offset is less than the first minimum slot offset, the terminal device determines that the first minimum slot offset is the slot offset of the A-CSI-RS relative to the PDCCH for scheduling the A-CSI-RS. When the first slot offset is greater than or equal to the first minimum slot offset, the terminal device determines that the first slot offset is the slot offset of the A-CSI-RS relative to the PDCCH for scheduling the A-CSI-RS.

Specifically, as described above, for the PUSCH, the network device performs time domain resource scheduling for the PUSCH based on each time domain resource allocation pattern in the PUSCH time domain resource list. When the network device performs time domain resource scheduling for the PUSCH based on the first time domain resource allocation pattern including the first slot offset, there is a case in which the first slot offset is less than the first minimum slot offset. In this case, the terminal device receives or sends data based on the first minimum slot offset and a time domain resource parameter, other than the first slot offset, that is in the first time domain resource allocation pattern. When the network device schedules the PDSCH based on the first time domain resource allocation pattern including the first slot offset, there is also a case in which the first slot offset is greater than or equal to the first minimum slot offset. In this case, the terminal device receives or sends data based on the first time domain resource allocation pattern. It may be understood that, in this case, the first minimum slot offset is the minimum slot offset of the PUSCH relative to the PDCCH for scheduling the PUSCH, or the first minimum slot offset is the common minimum slot offset of the PDSCH relative to the PDCCH for scheduling the PDSCH, the A-CSI-RS relative to the PDCCH for scheduling the A-CSI-RS, and the PUSCH relative to the PDCCH for scheduling the PUSCH.

Specifically, for the PUSCH, when the first slot offset is less than the first minimum slot offset, the terminal device determines that the first minimum slot offset is the slot offset of the PUSCH relative to the PDCCH for scheduling the PUSCH. When the first slot offset is greater than or equal to the first minimum slot offset, the terminal device determines that the first slot offset is the slot offset of the PUSCH relative to the PDCCH for scheduling the PUSCH.

The following describes updating the first minimum slot offset.

Further, the first minimum slot offset may remain unchanged before the next time the first-type WUS or the DCII indicates to update the first minimum slot offset.

Specifically, after the terminal device receives the first minimum slot offset from the network device in a first slot, the terminal device receives a second minimum slot offset from the network device. That is, the first minimum slot offset is updated to the second minimum slot offset.

The terminal device receives or sends data in a second slot based on the second minimum slot offset, where the second slot is an slot after the first slot, and n is the first PDSCH minimum slot offset. That is, the second minimum slot offset takes effect only in the second slot.

Figure 18:
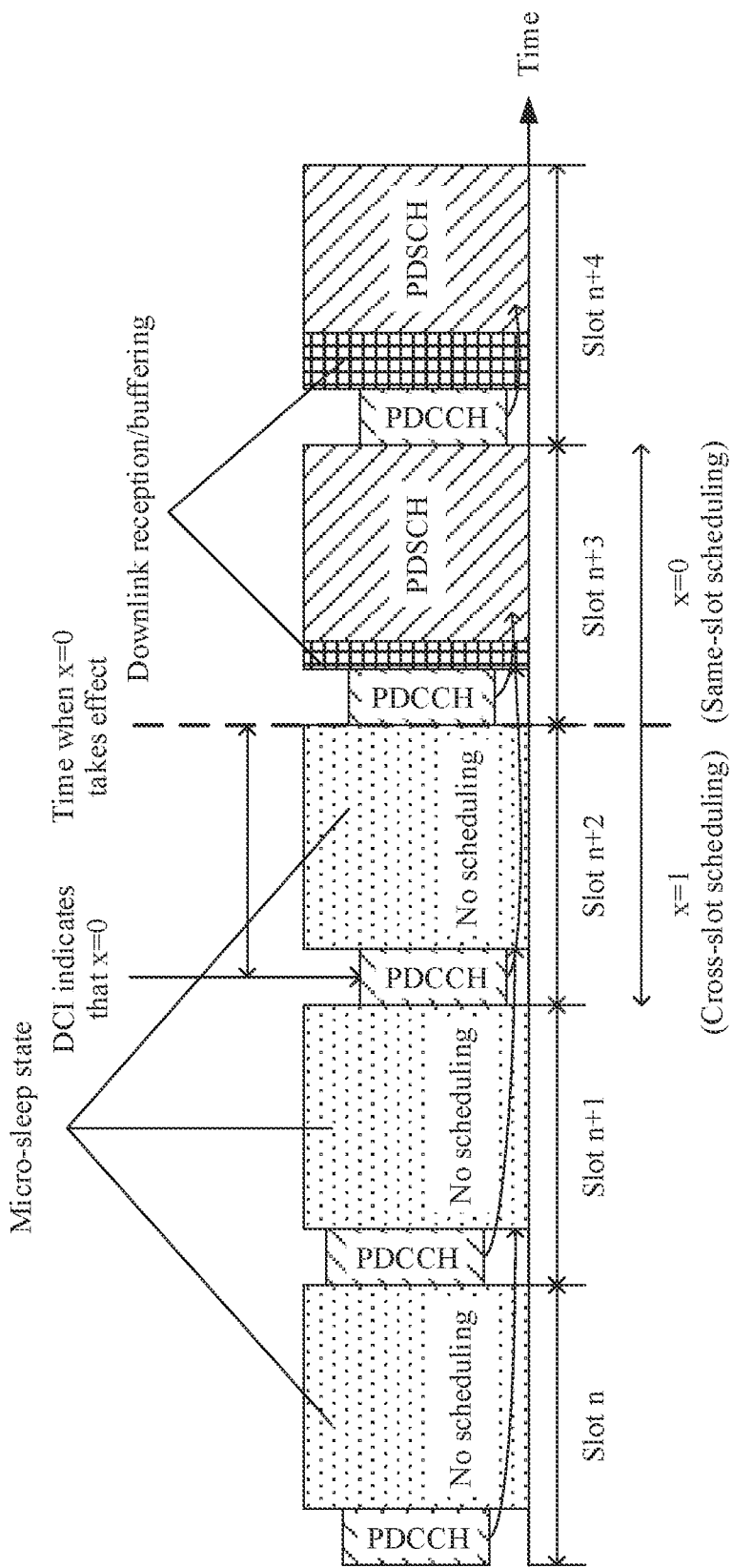
FIG. 18 is a schematic diagram of updating a PDSCH minimum slot offset according to an embodiment of this application.

With reference to FIG. 18, the following describes updating the minimum slot offset of the PDSCH relative to the PDCCH for scheduling the PDSCH. FIG. 18 is a schematic diagram of updating a PDSCH minimum slot offset according to an embodiment of this application.

Before DCI indicates to update a PDSCH minimum slot offset x to 0, a terminal device is in a cross-slot scheduling state (where the PDSCH minimum slot offset x is 1). The terminal device receives, in a slot n+2, the DCI that indicates to update the PDSCH minimum slot offset x to 0. Because the PDSCH minimum slot offset x=1 before the updating, that the PDSCH minimum slot offset x is 0 takes effect in a next slot of the slot n+2: a slot n+3.

After the DCI indicates to update the PDSCH minimum slot offset x to 0, if that the PDSCH minimum slot offset x is 0 takes effect immediately after the indication is completed, the terminal device can never know whether conversion into same-slot scheduling is to be indicated, and therefore does not dare to turn off modules such as a downlink receiving module and a downlink buffer module, and enters a micro-sleep (micro-sleep) state. Consequently, power cannot be saved. Micro-sleep herein only means that the modules such as the downlink receiving module and the downlink buffer module are turned off, but PDCCH decoding can still be performed.

In addition, if the first minimum slot offset is carried in a first-type WUS, all features of the first-type WUS described in the embodiments shown in FIG. 7 to FIG. 17 are applicable to this embodiment.

Further, if a PDSCH time domain resource list in this embodiment is in the form described in step S101: There are one or more PDSCH time domain resource lists, and a time domain offset, included in each PDSCH time domain resource list, of one or more PDSCHs relative to a PDCCH for scheduling the PDSCH is greater than a minimum slot offset of the PDSCH relative to the PDCCH for scheduling the PDSCH. In this case, when a network device performs time domain resource scheduling for the PDSCH based on each time domain resource allocation pattern in the one or more PDSCH time domain resource lists, a first slot offset included in a currently scheduled first time domain resource allocation pattern is definitely greater than or equal to a first minimum slot offset (where in this case, the first minimum slot offset is the minimum slot offset of the PDSCH relative to the PDCCH for scheduling the PDSCH; or the first minimum slot offset is a common minimum slot offset of the PDSCH relative to the PDCCH for scheduling the PDSCH and an A-CSI-RS relative to a PDCCH for scheduling the A-CSI-RS; or the first minimum slot offset is a common minimum slot offset of the PDSCH relative to the PDCCH for scheduling the PDSCH, an A-CSI-RS relative to a PDCCH for scheduling the A-CSI-RS, and a PUSCH relative to a PDCCH for scheduling the PUSCH). In other words, in this case, there is no case in which "if the first slot offset is less than the first minimum slot offset, the terminal device receives or sends data based on the first minimum slot offset and a time domain resource parameter, other than the first slot offset, that is in the first time domain resource allocation pattern", and there is only a case in which "the terminal device receives or sends data based on the first time domain resource allocation pattern".

If an aperiodic CSI triggering state list of the A-CSI-RS in this embodiment is in the form described in step S101, there are one or more aperiodic CSI triggering state lists of the A-CSI-RS, and a time domain offset, included in each A-CSI-RS periodic CSI triggering state list, of one or more A-CSI-RSs relative to a PDCCH for scheduling the A-CSI-RS is greater than a minimum slot offset of the A-CSI-RS relative to the PDCCH for scheduling the A-CSI-RS. In this case, when a network device performs time domain resource scheduling for the A-CSI-RS based on each time domain resource pattern in the one or more aperiodic CSI triggering state lists of the A-CSI-RS, a first slot offset included in a currently scheduled first time domain resource pattern is definitely greater than or equal to a first minimum slot offset (where in this case, the first minimum slot offset is the minimum slot offset of the A-CSI-RS relative to the PDCCH for scheduling the A-CSI-RS; or the first minimum slot offset is a common minimum slot offset of the PDSCH relative to the PDCCH for scheduling the PDSCH and an A-CSI-RS relative to a PDCCH for scheduling the A-CSI-RS; or the first minimum slot offset is a common minimum slot offset of the PDSCH relative to the PDCCH for scheduling the PDSCH, an A-CSI-RS relative to a PDCCH for scheduling the A-CSI-RS, and a PUSCH relative to a PDCCH for scheduling the PUSCH). In other words, in this case, there is no case in which "if the first slot offset is less than the first minimum slot offset, the terminal device receives or sends data based on the first minimum slot offset and a time domain resource parameter, other than the first slot offset, that is in the first time domain resource pattern", and there is only a case in which "the terminal device receives or sends data based on the first time domain resource pattern".

Further, if a PUSCH time domain resource list in this embodiment is in the form described in step S101: There are one or more PUSCH time domain resource lists, and one or more time domain offsets, included in each PUSCH time domain resource list, of a PUSCH relative to a PDCCH for scheduling the PDSCH are all greater than a minimum slot offset of the PUSCH relative to the PDCCH for scheduling the PUSCH. In this case, when a network device performs time domain resource scheduling for the PUSCH based on each time domain resource allocation pattern in the one or more PUSCH time domain resource lists, a first slot offset included in a currently scheduled first time domain resource allocation pattern is definitely greater than or equal to a first minimum slot offset (where in this case, the first minimum slot offset is the minimum slot offset of the PUSCH relative to the PDCCH for scheduling the PUSCH; or the first minimum slot offset is a common minimum slot offset of the PDSCH relative to the PDCCH for scheduling the PDSCH, an A-CSI-RS relative to a PDCCH for scheduling the A-CSI-RS, and the PUSCH relative to the PDCCH for scheduling the PUSCH). In other words, in this case, there is no case in which "if the first slot offset is less than the first minimum slot offset, the terminal device receives or sends data based on the first minimum slot offset and a time domain resource parameter, other than the first slot offset, that is in the first time domain resource allocation pattern", and there is only a case in which "the terminal device receives or sends data based on the first time domain resource allocation pattern".

The method in this embodiment can ensure that in a data transmission process, no slot offset of a PUSCH and/or a PDSCH and/or an A-CSI-RS relative to a PDCCH is greater than a corresponding minimum slot offset, thereby improving a probability of reducing energy consumption of the terminal. In addition, after the slot offset of the PUSCH and/or the PDSCH and/or the A-CSI-RS relative to the PDCCH is updated, the updated slot offset does not take effect immediately. Therefore, transmission performance is not affected while the power consumption of the terminal is reduced.

It may be understood that, in the foregoing embodiments, operations or steps implemented by the terminal device may alternatively be implemented by a component (for example, a chip or a circuit) that may be used in the terminal, and operations or steps implemented by the network device may alternatively be implemented by a component (for example, a chip or a circuit) that may be used in the network device. This is not limited in the embodiments of this application.

The foregoing describes the communication method in the embodiments of this application, and the following describes a communications apparatus in this application.

Figure 19:
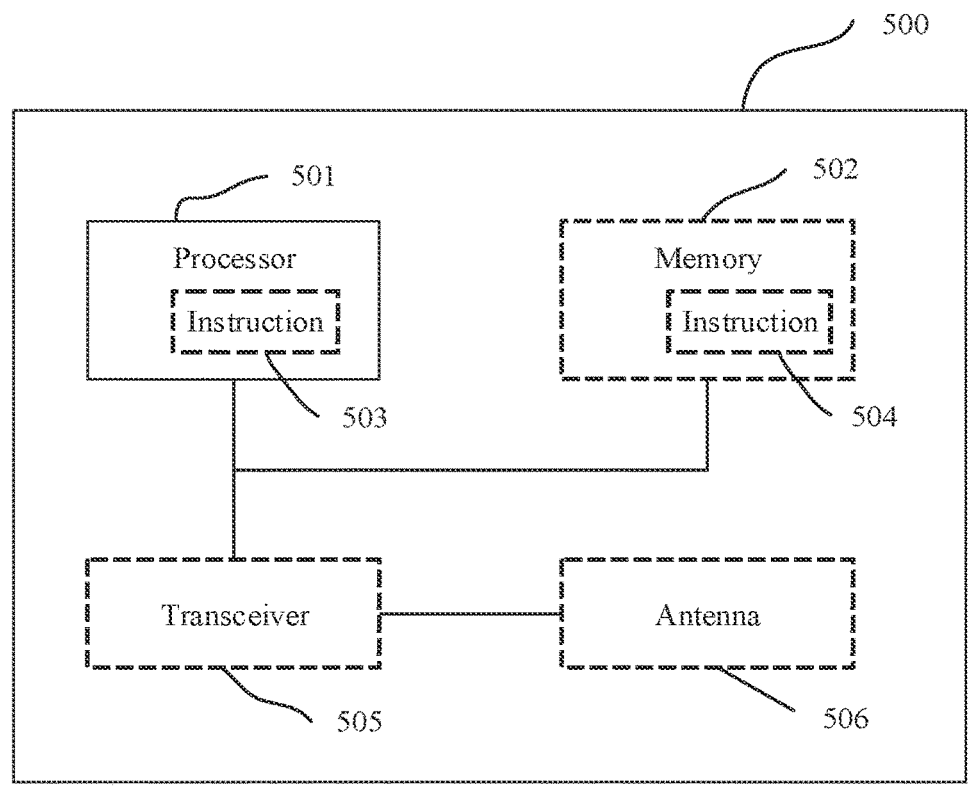
FIG. 19 is a schematic structural diagram of a communications apparatus according to an embodiment of this application.

FIG. 19 is a schematic structural diagram of a communications apparatus according to an embodiment of this application. As shown in FIG. 19, the communications apparatus 500 in this embodiment may be the terminal device (or a component that may be used in the terminal device) or the network device (or a component that may be used in the network device) mentioned in the foregoing method embodiments. The communications apparatus may be configured to implement the method that corresponds to the terminal device or the network device and that is described in the foregoing method embodiments. For details, refer to the descriptions in the foregoing method embodiments.

The communications apparatus 500 may include one or more processors 501. The processor 501 may also be referred to as a processing unit, and may implement a specific control or processing function. The processor 501 may be a general-purpose processor, a dedicated processor, or the like. For example, the processor 501 may be a baseband processor or a central processing unit. The baseband processor may be configured to process a communication protocol and communication data. The central processing unit may be configured to control the communications apparatus, execute a software program, and process data of the software program.

In an optional design, the processor 501 may alternatively store an instruction 503 or data (for example, intermediate data). The instruction 503 may be run by the processor, so that the communications apparatus 500 performs the method corresponding to the terminal device or the network device described in the foregoing method embodiments.

In another possible design, the communications apparatus 500 may include a circuit, and the circuit may implement the sending function, the receiving function, or the communication function in the foregoing method embodiments.

Optionally, the communications apparatus 500 may include one or more memories 502 that may store an instruction 504. The instruction may be run on the processor, so that the communications apparatus 500 performs the method described in the foregoing method embodiments.

Optionally, the memory may alternatively store data. The processor and the memory may be separately disposed, or may be integrated together.

Optionally, the communications apparatus 500 may further include a transceiver 505 and/or an antenna 506. The processor 501 may be referred to as a processing unit, and controls the communications apparatus (the terminal device or the network device). The transceiver 505 may be referred to as a transceiver unit, a transceiver machine, a transceiver circuit, a transceiver, or the like, and is configured to implement a transceiver function of the communications apparatus.

In a design, if the communications apparatus 500 is configured to implement an operation corresponding to the terminal device in the foregoing embodiments, for example, the transceiver 505 may receive a first-type wake-up signal WUS from the network device, and the processor 501 performs, based on the first-type WUS, an operation of performing PDCCH monitoring in on duration in one or more discontinuous reception DRX cycles corresponding to the first-type WUS.

For specific implementation processes of the transceiver 505 and the processor 501, refer to related descriptions in the foregoing embodiments. Details are not described herein again.

In another design, if the communications apparatus is configured to implement an operation corresponding to the network device in the foregoing embodiments, for example, the transceiver 505 may be configured to send the first-type wake-up signal WITS from the network device to the terminal device.

For a specific implementation process of the transceiver 505, refer to related descriptions in the foregoing embodiments. Details are not described herein again.

The processor 501 and the transceiver 505 described in this application may be implemented on an integrated circuit (integrated circuit, IC), an analog IC, a radio frequency integrated circuit (radio frequency integrated circuit, RFIC), a mixed signal IC, an application-specific integrated circuit (application specific integrated circuit, ASIC), a printed circuit board (printed circuit board, PCB), an electronic device, and the like. The processor and the transceiver may alternatively be manufactured by using various IC process technologies, for example, a complementary metal oxide semiconductor (complementary metal oxide semiconductor, CMOS), an n-type metal oxide semiconductor (n-type metal-oxide-semiconductor, NMOS), and a positive channel metal oxide semiconductor (positive channel metal oxide semiconductor, PMOS), a bipolar junction transistor (Bipolar Junction Transistor, BJT), a bipolar CMOS (BiCMOS), a silicon germanium (SiGe), gallium arsenide (GaAs), and the like.

It should be understood that, the processor mentioned in the embodiments of this application may be a central processing unit (Central Processing Unit, CPU), and the processor may further be another general-purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, discrete gate or transistor logic device, discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

Although in the foregoing descriptions of the embodiments, the communications apparatus 500 is described by using the terminal device or the network device as an example, a scope of the communications apparatus described in this application is not limited to the terminal device or the network device, and a structure of the communications apparatus may not be limited to that shown in FIG. 19. The communications apparatus 500 may be an independent device or may be a part of a relatively large device. For example, the device may be:

(1) an independent integrated circuit IC, a chip, or a chip system or subsystem;
(2) a set having one or more ICs, where optionally, the IC set may also include a storage component configured to store data and/or an instruction;
(3) an ASIC, such as a modem (MSM);
(4) a module that can be embedded in another device;
(5) a receiver, a terminal device, a cellular phone, a wireless device, a handheld phone, a mobile unit, a network device, or the like;
(6) another device; or the like.

Figure 20:
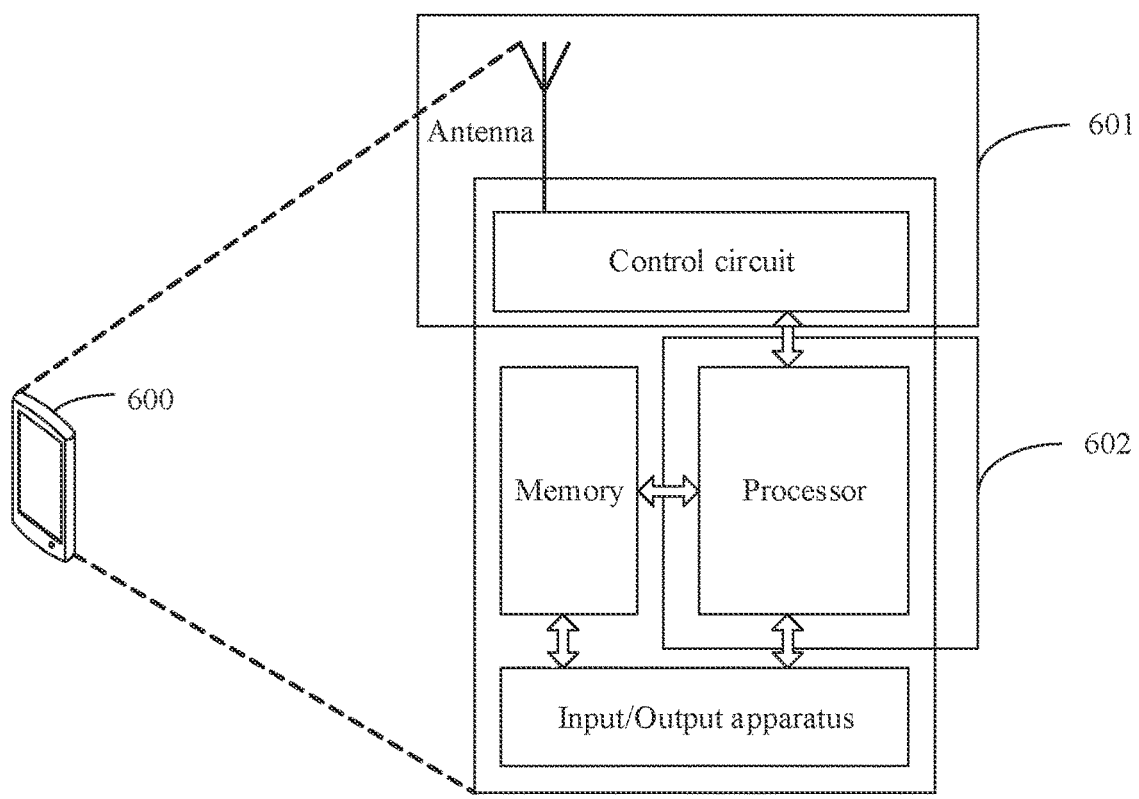
FIG. 20 is a schematic structural diagram of a terminal device according to an embodiment of this application.

FIG. 20 is a schematic structural diagram of a terminal device according to an embodiment of this application. The terminal device is applicable to the terminal device described in the foregoing embodiments of this application. For ease of description, FIG. 20 shows only main components of the terminal device. As shown in FIG. 20, the terminal device 600 includes a processor, a memory, a control circuit, an antenna, and an input/output apparatus. The processor is mainly configured to: process a communication protocol and communication data, control the entire terminal device, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to: receive data entered by a user, and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal outward in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data, A person skilled in the art may understand that for ease of description, FIG. 20 shows only one memory and only one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 20 integrates functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to be used in different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna and the control circuit that have a transceiver function may be considered as a transceiver module 601 of the terminal device 600, and the processor having a processing function may be considered as a processing module 602 of the terminal device 600. As shown in FIG. 20, the terminal device 600 includes the transceiver module 601 and the processing module 602. The transceiver module may also be referred to as a transceiver, a transceiver machine, a transceiver apparatus, or the like. Optionally, a component that is configured to implement a receiving function and that is in the transceiver module 601 may be considered as a receiving module, and a component that is configured to implement a sending function and that is in the transceiver module 601 may be considered as a sending module. That is, the transceiver module 601 includes the receiving module and the sending module. For example, the receiving module may also be referred to as a receiver, a receiver machine, a receiver circuit, or the like. The sending module may be referred to as a transmitter, a transmitter machine, a transmitter circuit, or the like.

Figure 21:
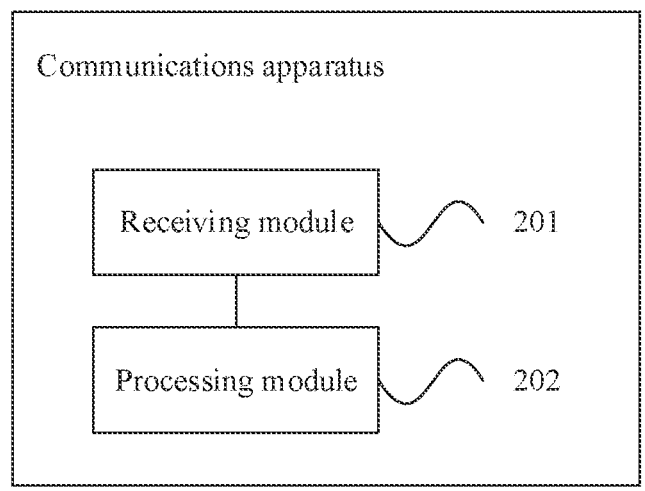
FIG. 21 is a schematic structural diagram of a communications apparatus according to another embodiment of this application.

FIG. 21 is a schematic structural diagram of a communications apparatus according to another embodiment of this application. The communications apparatus may be a terminal device, or may be a component (for example, an integrated circuit or a chip) of a terminal device, or may be another communications module, and the communications apparatus is configured to implement operations or steps corresponding to the terminal device in the method embodiments shown in FIG. 7 to FIG. 17, The communications apparatus may include a receiving module 201 and a processing module 202.

The receiving module 201 is configured to receive a first-type wake-up signal WUS from a network device, where the first-type WUS includes a first slot offset and/or a second slot offset, the first slot offset is a common minimum slot offset of a physical downlink shared channel PDSCH relative to a physical downlink control channel PDCCH for scheduling the PDSCH and an aperiodic channel state information reference signal A-CSI-RS relative to a PDCCH for scheduling the A-CSI-RS, and the second slot offset is a minimum slot offset of a physical uplink shared channel PUSCH relative to a PDCCH for scheduling the PUSCH.

The processing module 202 is configured to perform, based on the first-type WUS, PDCCH monitoring in on duration in one or more discontinuous reception DRX cycles corresponding to the first-type WUS.

Optionally, the receiving module 201 is further configured to receive a second-type WUS from the network device, where the second-type WUS includes wake-up information of a communications apparatus in a terminal group to which the communications apparatus belongs.

The processing module 202 is further configured to perform, based on wake-up information of the communications apparatus, PDCCH monitoring in on duration in one or more DRX cycles corresponding to the second-type WUS.

Optionally, the receiving module 201 is further configured to receive first monitoring information from the network device, where the first monitoring information includes a monitoring periodicity of a first signal and/or a monitoring occasion in the monitoring periodicity; or the receiving module 201 is further configured to receive first monitoring information from the network device, where the first monitoring information includes a search space set corresponding to a first signal; and the processing module 202 is further configured to determine a monitoring periodicity of the first signal and/or a monitoring occasion in the monitoring periodicity based on the search space set, where the first signal is the first-type WUS or the second-type WUS.

Optionally, the first-type WUS further includes second monitoring information, where the second monitoring information is used to indicate, to the communications apparatus, a monitoring periodicity of a subsequent first-type WUS and/or a monitoring occasion in the monitoring periodicity; or the second monitoring information is used to indicate the communications apparatus to skip monitoring the first-type WUS in one or more subsequent monitoring periodicities of the first-type WUS.

Optionally, the communications apparatus is configured with a long DRX cycle and a short DRX cycle, and the processing module 202 is further configured to skip monitoring the first-type WUS in the short DRX cycle.

Optionally, the processing module 202 is further configured to:
when the communications apparatus is in an active state, skip monitoring the second-type WUS, and not skip monitoring the first-type WUS, Optionally, the processing module 202 is further configured to skip, under a first condition, monitoring the second-type WUS, where
the first condition is that the monitoring occasion of the second-type WUS is the same as the monitoring occasion of the first-type WUS; or
a slot in which the monitoring occasion of the second-type WUS is located is the same as a slot in which the monitoring occasion of the first-type WUS is located; or
a DRX cycle in which the monitoring occasion of the second-type WUS is located is the same as a DRX cycle in which the monitoring occasion of the first-type WUS is located.

Optionally, the monitoring periodicity of the first-type WUS is greater than the monitoring periodicity of the second-type WUS; or a monitoring occasion set of the first-type WUS in a first time period is a subset of a monitoring occasion set of the second-type WUS in the first time period.

Optionally, the monitoring periodicity of the first-type WUS is N times the DRX cycle, the one or more DRX cycles corresponding to the first-type WUS are N consecutive DRX cycles, and N is an integer greater than or equal to 1; and/or
the monitoring periodicity of the second-type WUS is M times the DRX cycle, the one or more DRX cycles corresponding to the second-type WUS are M consecutive DRX cycles, and M is an integer greater than or equal to 1.

Optionally, the first-type WUS further includes at least one of the following information:
go-to-sleep GTS duration or a GTS pattern;
scheduling information of the A-CSI-RS;
scheduling information of an aperiodic sounding reference signal A-SRS;
activation information of a search space set corresponding to the PDCCH monitoring;
downlink bandwidth part IMP switching information and/or uplink IOW switching information;
component carrier CC wake-up information;
receive antenna information and transmit antenna information, where the receive antenna information is a quantity of receive antennas or a quantity of downlink transport layers, and the transmit antenna information is a quantity of transmit antennas or a quantity of uplink transport layers; or
DRX configuration effectivity information.

The communications apparatus in this embodiment may be configured to execute the technical solutions of the terminal device in the foregoing method embodiments. Their implementation principles and technical effects are similar, and details are not described herein again.

Figure 22:
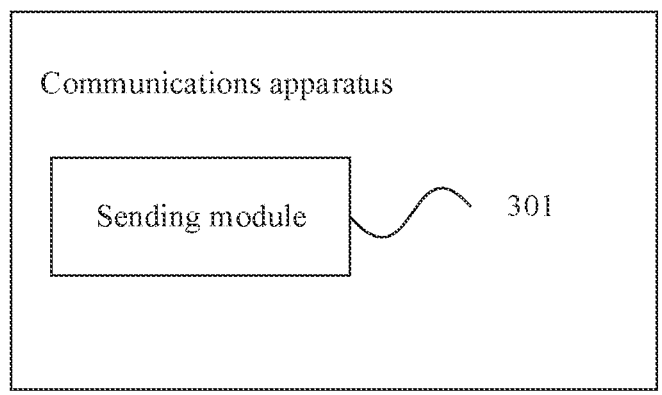
FIG. 22 is a schematic structural diagram of a communications apparatus according to another embodiment of this application.

FIG. 22 is a schematic structural diagram of a communications apparatus according to another embodiment of this application. The communications apparatus may be a network device, or may be a component (for example, an integrated circuit or a chip) of a network device, or may be another communications module, and the communications apparatus is configured to implement operations corresponding to the network device in the method embodiments shown in FIG. 7 to FIG. 17. The communications apparatus may include a sending module 301.

The sending module 301 is configured to send a first-type wake-up signal WUS to a terminal device, where the first-type WUS includes a first slot offset and/or a second slot offset. The first slot offset is a common minimum slot offset of a physical downlink shared channel PDSCH relative to a physical downlink control channel PDCCH for scheduling the PDSCH and an aperiodic channel state information reference signal A-CSI-RS relative to a PDCCH for scheduling the A-CSI-RS; and the second slot offset is a minimum slot offset of a physical uplink shared channel PUSCH relative to a PDCCH for scheduling the PUSCH, The first-type WUS indicates the terminal device to perform PDCCH monitoring in on duration in one or more discontinuous reception DRX cycles corresponding to the first-type WUS.

Optionally, the sending module 301 is further configured to send a second-type WUS to the terminal device, where the second-type WUS includes wake-up information of a terminal device in a terminal group to which the terminal device belongs, where wake-up information of the terminal device indicates the terminal device to perform PDCCH monitoring in on duration in one or more DRX cycles corresponding to the second-type WUS.

Optionally, the sending module 301 is further configured to send first monitoring information to the terminal device, where the first monitoring information includes a monitoring periodicity of a first signal and/or a monitoring occasion in the monitoring periodicity; or
the sending module 301 is further configured to send first monitoring information to the terminal device, where the first monitoring information includes a search space set corresponding to a first signal, and the search space set is used by the terminal device to determine a monitoring periodicity of the first signal and/or a monitoring occasion in the monitoring periodicity, where
the first signal is the first-type WUS or the second-type WUS.

Optionally, the first-type WUS further includes second monitoring information,
The second monitoring information is used to indicate, to the terminal device, a monitoring periodicity of a subsequent first-type MIS and/or a monitoring occasion in the monitoring periodicity; or the second monitoring information is used to indicate the terminal device to skip monitoring the first-type WUS in one or more subsequent monitoring periodicities of the first-type WUS.

Optionally, the monitoring periodicity of the first-type WUS is greater than the monitoring periodicity of the second-type WUS; or a monitoring occasion set of the first-type WUS in a first time period is a subset of a monitoring occasion set of the second-type WUS in the first time period.

Optionally, the first-type WUS further includes at least one of the following information:
go-to-sleep GTS duration or a GTS pattern;
scheduling information of the A-CSI-RS;
scheduling information of an aperiodic sounding reference signal A-SRS;
activation information of a search space set corresponding to the PDCCH monitoring;
downlink bandwidth part BWP switching information and/or uplink BWP switching information;
component carrier CC wake-up information;
receive antenna information and transmit antenna information, where the receive antenna information is a quantity of receive antennas or a quantity of downlink transport layers, and the transmit antenna information is a quantity of transmit antennas or a quantity of uplink transport layers; or DRX configuration effectivity information.

The communications apparatus in this embodiment may be configured to execute the technical solutions of the network device in the foregoing method embodiments. Their implementation principles and technical effects are similar, and details are not described herein again.

It should be noted that, in the embodiments of this application, module division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

An embodiment of this application further provides a readable storage medium. The readable storage medium stores a computer program. When the computer program is executed, the communication method corresponding to the terminal device or the communication method corresponding to the network device is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD a semiconductor medium (for example, a solid-state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   receiving monitoring information from a network device, wherein the monitoring information comprises information of a search space set corresponding to a wake-up signal (WUS), wherein the information of the search space set identifies one or more search space sets to be activated, wherein each of the one or more search space sets includes a monitoring periodicity and an intra-slot monitoring start symbol;
   determining at least one of a monitoring periodicity of the WUS or a monitoring occasion in the monitoring periodicity based on the information of the search space set;
   receiving the WUS from the network device, wherein the WUS comprises wake-up information of at least one terminal device, and wherein the WUS comprises a first index indicating scheduling information of an aperiodic channel state information reference signal (A-CSI-RS), a go-to-sleep (GTS) duration, and a second index indicating a GTS pattern; and
   performing, based on wake-up information of a terminal device, physical downlink control channel (PDCCH) monitoring in an on duration of at least one discontinuous reception (DRX) cycle corresponding to the WUS, wherein the wake-up information of at least one terminal device comprises the wake-up information of the terminal device.

2. The method according to claim 1, wherein the WUS is downlink control information.

3. The method according to claim 2, further comprising:
   receiving, from the network device, a radio network temporary identifier (RNTI) used to scramble the WUS.

4. The method according to claim 1, wherein the wake-up information of the terminal device is one bit, a '1' value of the bit indicates the terminal device wakes up to perform PDCCH monitoring and a '0' value of the bit indicates the terminal device does not wake up to perform PDCCH monitoring.

5. The method according to claim 3, further comprising:
   when the terminal device is in an active state, skipping using the RNTI used to scramble the WUS to perform PDCCH monitoring.

6. The method according to claim 1, wherein the WUS is monitored on a monitoring occasion of the WUS corresponding to a sleep state of the terminal device and the WUS is not monitored on a monitoring occasion of the WUS corresponding to an active state of the terminal device.

7. A communication method, comprising:
   sending monitoring information to a terminal device, wherein the monitoring information comprises information of a search space set corresponding to a wake-up signal (WUS), and the information of the search space set is used by the terminal device to determine at least one of a monitoring periodicity of the WUS or a monitoring occasion in the monitoring periodicity, wherein the information of the search space set identifies one or more search space sets to be activated, wherein each of the one or more search space sets includes a monitoring periodicity and an intra-slot monitoring start symbol; and sending the WUS to the terminal device, wherein the WUS comprises wake-up information of at least one terminal device, wherein wake-up information of the terminal device indicates the terminal device to perform physical downlink control channel (PDCCH) monitoring in an on duration of at least one discontinuous reception (DRX) cycle corresponding to the WUS, wherein the wake-up information of at least one terminal device comprises the wake-up information of the terminal device, and wherein the WUS comprises a first index indicating scheduling information of an aperiodic channel state information reference signal (A-CSI-RS), a go-to-sleep (GTS) duration, and a second index indicating a GTS pattern.

8. The method according to claim 7, further comprising:
sending, to the terminal device, a radio network temporary identifier (RNTI) used to scramble the WUS, wherein the WUS is downlink control information.

9. The method according to claim 8, wherein the wake-up information of the terminal device is one bit, a '1' value of the bit indicates the terminal device wakes up to perform PDCCH monitoring and a '0' value of the bit indicates the terminal device does not wake up to perform PDCCH monitoring.

10. The method according to claim 7, wherein the WUS is monitored by the terminal device on a monitoring occasion of the WUS corresponding to a sleep state of the terminal device and the WUS is not monitored by the terminal device on a monitoring occasion of the WUS corresponding to an active state of the terminal device.

11. An apparatus, comprising at least one processor configured to:
receive monitoring information, wherein the monitoring information comprises information of a search space set corresponding to a wake-up signal (WUS), wherein the information of the search space set identifies one or more search space sets to be activated, wherein each of the one or more search space sets includes a monitoring periodicity and an intra-slot monitoring start symbol;
determine at least one of a monitoring periodicity of the WUS or a monitoring occasion in the monitoring periodicity based on the information of the search space set;
receive the WUS, wherein the WUS comprises wake-up information of at least one terminal device, and wherein the WUS comprises a first index indicating scheduling information of an aperiodic channel state information reference signal (A-CSI-RS), a go-to-sleep (GTS) duration, and a second index indicating a GTS pattern; and
monitor physical downlink control channel (PDCCH) based on wake-up information of the terminal device in an on duration of at least one discontinuous reception (DRX) cycle corresponding to the WUS, wherein the wake-up information of at least one terminal device comprises the wake-up information of the terminal device.

12. The apparatus according to claim 11, wherein the at least one processor is further configured to:
receive a radio network temporary identifier (RNTI) used to scramble the WUS, wherein the WUS is downlink control information.

13. The apparatus according to claim 11, wherein the wake-up information of the terminal device is one bit, a '1' value of the bit indicates the terminal device wakes up to perform PDCCH monitoring and a '0' value of the bit indicates the terminal device does not wake up to perform PDCCH monitoring.

14. The apparatus according to claim 11, wherein the WUS is monitored on a monitoring occasion of the WUS corresponding to a sleep state of the terminal device and the WUS is not monitored on a monitoring occasion of the WUS corresponding to an active state of the terminal device.

15. An apparatus, comprising at least one processor configured to:
send monitoring information, wherein the monitoring information comprises information of a search space set corresponding to a wake-up signal (WUS), and the information of the search space set is used by a terminal device to determine at least one of a monitoring periodicity of the WUS or a monitoring occasion in the monitoring periodicity, wherein the information of the search space set identifies one or more search space sets to be activated, wherein each of the one or more search space sets includes a monitoring periodicity and an intra-slot monitoring start symbol; and
send the WUS, wherein the WUS comprises wake-up information of at least one terminal device, wherein wake-up information of the terminal device indicates the terminal device to perform physical downlink control channel (PDCCH) monitoring in an on duration of at least one discontinuous reception (DRX) cycle corresponding to the WUS, wherein the wake-up information of at least one terminal device comprises the wake-up information of the terminal device, and wherein the WUS comprises a first index indicating scheduling information of an aperiodic channel state information reference signal (A-CSI-RS), a go-to-sleep (GTS) duration, and a second index indicating a GTS pattern.

16. The apparatus according to claim 15, wherein the at least one processor is further configured to:
send, to the terminal device, a radio network temporary identifier (RNTI) used to scramble the WUS, wherein the WUS is downlink control information, the wake-up information of the terminal device is one bit, a '1' value of the bit indicates the terminal device wakes up to perform PDCCH monitoring and a '0' value of the bit indicates the terminal device does not wake up to perform PDCCH monitoring.

17. The apparatus according to claim 15, wherein the WUS is monitored by the terminal device on a monitoring occasion of the WUS corresponding to a sleep state of the terminal device and the WUS is not monitored by the terminal device on a monitoring occasion of the WUS corresponding to an active state of the terminal device.

18. A non-transitory, computer-readable storage medium storing one or more instructions executable by a computer system to perform operations comprising:
receive monitoring information, wherein the monitoring information comprises information of a search space set corresponding to a wake-up signal (WUS), wherein the information of the search space set identifies one or more search space sets to be activated, wherein each of the one or more search space sets includes a monitoring periodicity and an intra-slot monitoring start symbol;

determine at least one of a monitoring periodicity of the WUS or a monitoring occasion in the monitoring periodicity based on the information of the search space set;

receive the WUS, wherein the WUS comprises wake-up information of at least one terminal device; and wherein the WUS comprises a first index indicating scheduling information of an aperiodic channel state information reference signal (A-CSI-RS), a go-to-sleep (GTS) duration, and a second index indicating a GTS pattern; and monitor physical downlink control channel (PDCCH) based on wake-up information of the terminal device in an on duration of at least one discontinuous reception (DRX) cycle corresponding to the WUS, wherein the wake-up information of at least one terminal device comprises the wake-up information of the terminal device.

19. The non-transitory, computer-readable storage medium according to claim 18, wherein the WUS is downlink control information, the wake-up information of the terminal device is one bit, a '1' value of the bit indicates the terminal device wakes up to perform PDCCH monitoring and a '0' value of the bit indicates the terminal device does not wake up to perform PDCCH monitoring.

20. The non-transitory, computer-readable storage medium according to claim 18, wherein the WUS is monitored on a monitoring occasion of the WUS corresponding to a sleep state of the terminal device and the WUS is not monitored on a monitoring occasion of the WUS corresponding to an active state of the terminal device.

* * * * *